United States Patent
Kwak et al.

(10) Patent No.: US 12,022,512 B2
(45) Date of Patent: Jun. 25, 2024

(54) MECHANISMS TO OPERATE DOWNLINK WIDEBAND CARRIER IN UNLICENSED BAND

(71) Applicant: Apple Inc., Cupertino, CA (US)

(72) Inventors: Yongjun Kwak, Portland, OR (US); Lopamudra Kundu, Santa Clara, CA (US); Salvatore Talarico, Sunnyvale, CA (US); Yingyang Li, Beijing (CN)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 17/441,532

(22) PCT Filed: May 1, 2020

(86) PCT No.: PCT/US2020/030960
§ 371 (c)(1),
(2) Date: Sep. 21, 2021

(87) PCT Pub. No.: WO2020/227068
PCT Pub. Date: Nov. 12, 2020

(65) Prior Publication Data
US 2022/0174739 A1  Jun. 2, 2022

Related U.S. Application Data

(60) Provisional application No. 62/843,064, filed on May 3, 2019.

(51) Int. Cl.
*H04W 74/0816* (2024.01)
*H04L 1/00* (2006.01)
(Continued)

(52) U.S. Cl.
CPC ....... *H04W 74/0816* (2013.01); *H04L 1/0068* (2013.01); *H04W 72/0446* (2013.01); *H04W 74/006* (2013.01); *H04W 74/0866* (2013.01)

(58) Field of Classification Search
CPC ......... H04W 74/0816; H04W 72/0446; H04W 74/006; H04W 74/0866; H04W 72/0453;
(Continued)

(56) References Cited

U.S. PATENT DOCUMENTS

2019/0268883 A1* 8/2019 Zhang ................... H04L 5/0094
2020/0092861 A1* 3/2020 Xu ....................... H04W 74/002
(Continued)

FOREIGN PATENT DOCUMENTS

CN     108781149      11/2018

OTHER PUBLICATIONS

WO_2019194624_A1_I (Year: 2019).*
(Continued)

*Primary Examiner* — Rushil P. Sampat
(74) *Attorney, Agent, or Firm* — Fish & Richardson P.C.

(57) ABSTRACT

Systems, devices, and techniques for listen-before-talk (LBT) operations in unlicensed spectrum are described. A described technique includes receiving, by a user equipment (UE), a downlink control information (DCI) message, the DCI message including available bandwidth information and a channel occupancy time (COT) duration, the available bandwidth information being associated with one or more LBT bandwidths of a bandwidth part (BWP) in unlicensed spectrum; receiving, by the UE, one or more physical downlink shared channel (PDSCH) transmissions in the BWP, during the COT duration; and processing the one or more PDSCH transmissions based on the available bandwidth information.

18 Claims, 14 Drawing Sheets

(51) Int. Cl.
*H04W 72/0446* (2023.01)
*H04W 74/00* (2009.01)
*H04W 74/08* (2009.01)

(58) Field of Classification Search
CPC . H04W 74/0808; H04W 76/28; H04W 72/23; H04L 1/0068; H04L 27/0006; H04L 5/0053; H04L 5/0078; H04L 5/0098; H04L 5/0044
See application file for complete search history.

(56) References Cited

U.S. PATENT DOCUMENTS

| | | | |
|---|---|---|---|
| 2020/0236709 A1 | 7/2020 | Park et al. | |
| 2021/0345124 A1* | 11/2021 | Myung | H04W 16/14 |
| 2021/0367743 A1* | 11/2021 | Kim | H04L 5/0098 |

OTHER PUBLICATIONS

U.S. Appl. No. 62/731,418_Specification_Drawings_filed Sep. 14, 2018 (Year: 2018).*
[No Author Listed], "3rd Generation Partnership Project; Technical Specification Group Radio Access Network; Evolved Universal Terrestrial Radio Access (E-UTRA); Physical channels and modulation (Release 15)," 3GPP TS 36.211 V15.5.0, Mar. 2019, 238 pages.
[No Author Listed], "3rd Generation Partnership Project; Technical Specification Group Radio Access Network; NR; NR and NG-RAN Overall Description; Stage 2 (Release 15)," 3GPP TS 38.300 V15.5.0, Mar. 2019, 97 pages.
[No Author Listed], "3rd Generation Partnership Project; Technical Specification Group Radio Access Network; NR; Physical channels and modulation (Release 15)," 3GPP TS 38.211 V15.5.0, Mar. 2019, 96 pages.
[No Author Listed], "3rd Generation Partnership Project; Technical Specification Group Radio Access Network; Physical layer procedures for shared spectrum channel access (Release 15)," 3GPP TS 37.213 V15.2.0, Mar. 2019, 20 pages.
[No Author Listed], "3rd Generation Partnership Project; Technical Specification Group Services and System Aspects; Architecture enhancements for non-3GPP accesses (Release 15)," 3GPP TS 23.402 V15.3.0, Mar. 2018, 314 pages.
[No Author Listed], "3rd Generation Partnership Project; Technical Specification Group Radio Access Network; NR; Multiplexing and channel coding (Release 16)," Sections 5.3.3 and 7.3, 3GPP TS 38.212, V 16.0.0, Dec. 2019, 152 pages.
[No Author Listed], "3rd Generation Partnership Project; Technical Specification Group Radio Access Network; NR; Physical layer procedures for control (Release 16)," 11.1.1 section of 3GPP TS 38.213, V 16.0.0, Dec. 2019, 155 pages.
Fujitsu, "On DL signals and channels for NR-U," 3GPP TSG RAN WG1 #97, R1-1906431, Reno, USA, May 13-17, 2019, 5 pages.
Fujitsu, "On wideband operation for NR-U," 3GPP TSG RAN WG1 #97, R1-1906435, Reno, US, May 13-17, 2019, 4 pages.
International Preliminary Report on Patentability in International Appln. No. PCT/US2020/030960, dated Nov. 18, 2021, 8 pages.
International Search Report and Written Opinion in International Appln. No. PCT/US2020/030960, dated Jul. 28, 2020, 14 pages.

* cited by examiner

MECHANISMS TO OPERATE DOWNLINK WIDEBAND CARRIER IN UNLICENSED BAND

CROSS-REFERENCE TO RELATED APPLICATION

This application is a U.S. National Phase Application under 35 U.S.C. § 371 and claims the benefit of priority to International Application No. PCT/US2020/030960, filed May 1, 2020, which claims priority to U.S. Provisional Patent Application No. 62/843,064, entitled "MECHANISMS TO OPERATE DOWNLINK WIDEBAND CARRIER IN UNLICENSED BAND," filed on May 3, 2019. The above-identified applications are incorporated herein by reference in their entirety.

TECHNICAL FIELD

This disclosure relates generally to wireless communication systems.

BACKGROUND

Base stations, such as a node of radio access network (RAN), can wirelessly communicate with wireless devices such as user equipment (UE). A downlink (DL) transmission refers to a communication from the base station to the wireless device. An uplink (UL) transmission refers to a communication from the wireless device to another device such as the base station. Base stations can transmit control signaling in order to control wireless devices that operate within their network.

SUMMARY

Systems, devices, and techniques for listen-before-talk (LBT) operations in unlicensed spectrum are described. A described technique includes receiving, by a UE, a downlink control information (DCI) message, the DCI message including available bandwidth information and a channel occupancy time (COT) duration, the available bandwidth information being associated with one or more LBT bandwidths of a bandwidth part (BWP) in unlicensed spectrum; receiving, by the UE, one or more physical downlink shared channel (PDSCH) transmissions in the BWP, during the COT duration; and processing the one or more PDSCH transmissions based on the available bandwidth information. Other implementations include corresponding systems, apparatus, and computer programs to perform the actions of methods defined by instructions encoded on computer readable storage.

These and other implementations can include one or more of the following features. Receiving the DCI message can include receiving the DCI message over a group common physical downlink control channel (GC-PDCCH). Implementations can include decoding at one or more PDCCH candidate locations within the BWP to locate the GC-PDCCH. In some implementations, the decoding includes decoding at the one or more PDCCH candidate locations during two or more monitoring occasions within the COT duration. In some implementations, the DCI message includes an indication of an available LBT bandwidth. In some implementations, the DCI message is carried in a primary channel. Implementations can include determining a primary channel based on detecting a demodulation reference signal (DMRS) or decoding the GC-PDCCH. In some implementations, receiving the DCI message includes receiving the DCI message over a GC-PDCCH in licensed spectrum.

In some implementations, the one or more PDSCH transmissions include a first PDSCH transmission and a second PDSCH transmission. The first PDSCH transmission can be encoded using the BWP in its entirety including one or more available LBT bandwidths of the BWP and one or more unavailable LBT bandwidths of the BWP. Puncturing can be applied to the one or more unavailable LBT bandwidths. The second PDSCH transmission can be encoded using the one or more available LBT bandwidths. Implementations can include encoding data for a physical uplink shared channel (PUSCH) transmission using the BWP in its entirety including one or more available LBT bandwidths of the BWP and one or more unavailable LBT bandwidths of the BWP, where puncturing is applied to the one or more unavailable LBT bandwidths.

A UE can include one or more processors, a transceiver, and a memory storing instructions that, when executed by the one or more processors, cause the one or more processors to perform operations. The operations can include receiving, via the transceiver, a DCI message, the DCI message including available bandwidth information and a COT duration, the available bandwidth information being associated with one or more LBT bandwidths of a BWP in unlicensed spectrum; receiving, via the transceiver, one or more PDSCH transmissions in the BWP during the COT duration; and processing the one or more PDSCH transmissions based on the available bandwidth information. In some implementations, a communication processor includes circuitry configured to receive a DCI message, the DCI message including available bandwidth information and a COT duration, the available bandwidth information being associated with one or more LBT bandwidths of a BWP in unlicensed spectrum; circuitry configured to receive one or more PDSCH transmissions in the BWP during the COT duration; and circuitry configured to process the one or more PDSCH transmissions based on the available bandwidth information.

A base station can include one or more processors, a transceiver, and a memory storing instructions that, when executed by the one or more processors, cause the one or more processors to perform operations. The operations can include performing, via the transceiver, a LBT procedure on a plurality of LBT bandwidths of a bandwidth part BWP in an unlicensed spectrum to produce LBT outcomes; selecting one or more LBT bandwidths of the plurality of LBT bandwidths based on the LBT outcomes; transmitting, via the transceiver, a DCI message that indicates the selected one or more LBT bandwidths, the DCI message including available bandwidth information and a COT duration; and performing, via the transceiver, one or more PDSCH transmissions in the one or more selected LBT bandwidths during the COT duration.

These and other implementations can include one or more of the following features. Transmitting the DCI message can include transmitting the DCI message over a GC-PDCCH in a primary channel. In some implementations, the operations include transmitting the DCI message over the GC-PDCCH two or more times during the COT duration. In some implementations, transmitting the DCI message includes transmitting the DCI message over a GC-PDCCH in licensed spectrum. In some implementations, the one or more PDSCH transmissions include a first PDSCH transmission and a second PDSCH transmission. The first PDSCH transmission can be encoded using the BWP in its entirety including one or more available LBT bandwidths of the BWP and one or more unavailable LBT bandwidths of the BWP such that puncturing is applied to the one or more unavailable LBT bandwidths. The second PDSCH transmission can be encoded using the one or more available LBT bandwidths. Performing the LBT procedure can include performing a clear channel assessment (CCA) on each of the LBT bandwidths.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
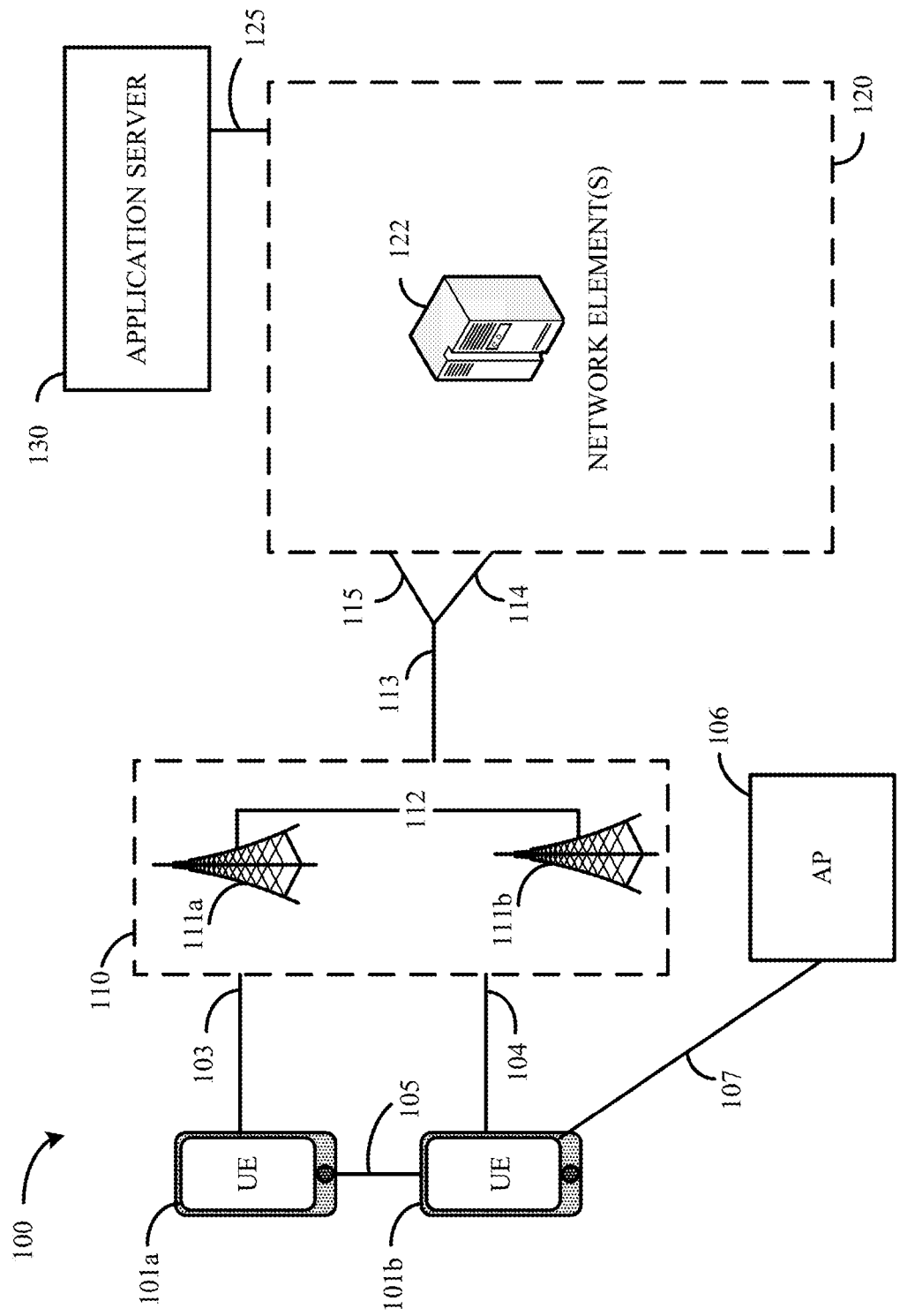
FIG. 1 illustrates an example of a wireless communication system.

FIG. 1 illustrates an example of a wireless communication system 100. For purposes of convenience and without limitation, the example system 100 is described in the context of the LTE and 5G NR communication standards as defined by the Third Generation Partnership Project (3GPP) technical specifications. In this example, the system 100 can include RAN nodes 111a, 111b and UEs 101a, 110b configured for communications based on a NR-Unlicensed (NR-U) protocol which uses unlicensed spectrum. Additional and other types of communication standards are possible.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 can include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some implementations, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which can include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with a radio access network (RAN) 110. A RAN can also be referred to as an access network (AN). In some implementations, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which can include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols.

The RAN 110 can include one or more RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, road side units (RSUs), and the like, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100

(for example, a gNB), and the term "E-UTRAN node" may refer to a RAN node 111 that operates in an LTE or 4G system 100 (e.g., an eNB). In some implementations, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some implementations, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink communications), although the scope of the techniques described here not limited in this respect. The OFDM signals can include a plurality of orthogonal subcarriers.

Downlink and uplink transmissions in some implementations may be organized into frames with 10 ms durations, where each frame includes ten 1 ms subframes. In some implementations, a slot duration is 14 symbols in a normal cyclic prefix (CP) mode and 12 symbols in an extended CP mode, and scales in time as a function of the used sub-carrier spacing so that there is an integer number of slots in a subframe. In some implementations, a downlink resource grid can be used for downlink transmissions from any of the RAN nodes 111 to the UEs 101, while uplink transmissions can utilize similar techniques. These resource grids may refer to time-frequency grids, and indicate physical resource in the DL or UL in each slot. In some implementations, each column and each row of the DL resource grid can correspond to one OFDM symbol and one OFDM subcarrier, respectively, and each column and each row of the UL resource grid can correspond to one SC-FDMA symbol and one SC-FDMA subcarrier, respectively.

The duration of the resource grid in the time domain can correspond to one slot in a radio frame. The resource grids can include a number of resource blocks (RBs), which describe the mapping of certain physical channels to resource elements (REs). In the frequency domain, this may represent the smallest quantity of resources that can be allocated. Each RB can include a collection of REs. A RE is the smallest time-frequency unit in a resource grid. Each RE can be uniquely identified by the index pair (k,l) in a slot where $$k = 0, \ldots, N_{RB}^{DL} N_{sc}^{RB} - 1$$

and $$l = 0, \ldots, N_{symb}^{DL} - 1$$

are the indices in the frequency and time domains, respectively. RE (k,l) on antenna port p corresponds to the complex value $$a_{k,l}^{(p)}.$$

An antenna port is defined such that the channel over which a symbol on the antenna port is conveyed can be inferred from the channel over which another symbol on the same antenna port is conveyed. There is one resource grid per antenna port. In some implementations, the set of antenna ports supported depends on the reference signal configuration in the cell.

The RAN nodes 111 can transmit to the UEs 101 over one or more DL channels. Various examples of DL communication channels include a physical broadcast channel (PBCH), physical downlink control channel (PDCCH), and physical downlink shared channel (PDSCH). Other types of downlink channels are possible. The UEs 101 can transmit to the RAN nodes 111 over one or more UL channels. Various examples of UL communication channels include physical uplink shared channel (PUSCH), physical uplink control channel (PUCCH), and physical random access channel (PRACH). Other types of uplink channels are possible. Devices such as the RAN nodes 111 and the UEs 101 can transmit reference signals. Examples of reference signals include a sounding reference signal (SRS), channel state information reference signal (CSI-RS), demodulation reference signal (DMRS or DM-RS), and phase tracking reference signal (PTRS). Other types of reference signals are possible.

Downlink and uplink transmissions can occur in one or more component carriers (CCs). In some implementations, one or more bandwidth part (BWP) configurations for each component carrier can be configured. In some implementations, a DL BWP includes at least one control resource set (CORESET). In some implementations, a CORESET includes one or more physical resource blocks (PRBs) in a frequency domain, and one or more OFDM symbols in a time domain. In some implementations, channels such as PDCCH can be transmitted via one or more CORESETs, with each CORESET corresponding to a set of time-frequency resources. CORESET information can be provided to a UE 101, and the UE 101 can monitor time-frequency resources associated with one or more CORESETs to receive a PDCCH transmission.

In some implementations, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). In some implementations, the licensed spectrum may include channels that operate in the frequency range of approximately 400 MHz to approximately 3.8 GHz, whereas the unlicensed spectrum may include the 5 GHz band. Other bands are possible.

To operate in the unlicensed spectrum, the UEs 101 and the RAN nodes 111 may operate for example using listen-before-talk (LBT) or licensed assisted access (LAA) mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a LBT protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA. In some implementations, performing a CCA procedure can include using an energy detection (ED) technique to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold. In some implementations, detecting less than a threshold amount of energy within a subband can cause CCA to pass, e.g., CCA is successful, for that subband. In some implementations, detecting more than a threshold amount of energy within a subband can cause CCA to fail for that subband. In some implementations, performing a CCA can include performing a carrier sense (CS) operation.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the Contention Window Size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y extended clear channel assessment (ECCA) slots, where X and Y are minimum and maximum values for the CWSs for LAA. In one example, the minimum CWS for an LAA transmission may be 9 microseconds (μs); however, the size of the CWS and a Maximum Channel Occupancy Time (MCOT) (for example, a transmission burst) may be based on governmental regulatory requirements.

The LAA mechanisms are built upon CA technologies of LTE-Advanced systems. In CA, each aggregated carrier can be referred to as a CC. A CC may have a bandwidth of 1.4, 3, 5, 10, 15, or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA can include individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual secondary component carrier (SCC) for both UL and DL. The SCCs may be added and removed as required, while changing the PCC may require the UE 101 to undergo a handover. In LAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

A channel such as PDCCH can convey scheduling information of different types for one or more downlink and uplink channels. Scheduling information can include downlink resource scheduling, uplink power control instructions, uplink resource grants, and indications for paging or system information. The RAN nodes 111 can transmit one or more downlink control information (DCI) messages on the PDCCH to provide scheduling information, such as allocations of one or more PRBs. In some implementations, a DCI message transports control information such as requests for aperiodic CQI reports, LAA common information, UL power control commands for a channel, and a notification for a group of UEs 101 of a slot format. Downlink scheduling (e.g., assigning control and shared channel resource blocks to the UE 101*b* within a cell) may be performed at any of the RAN nodes 111 based on channel quality information fed back from any of the UEs 101. The downlink resource assignment information may be sent on the PDCCH used for (e.g., assigned to) each of the UEs 101 or a group of UEs.

A downlink channel such as PDSCH carries user data and higher-layer signaling to the UEs 101 and can be scheduled by the PDCCH. In some implementations, the PDCCH carries information using DCI messages about the transport format and resource allocations related to the PDSCH channel, among other things. It may also inform the UEs 101 about the transport format, resource allocation, and hybrid automatic repeat request (HARQ) information related to the uplink shared channel.

In some implementations, the PDCCH uses control channel elements (CCEs) to convey the control information. A set of CCEs may be referred to a "control region." Control channels can be formed by an aggregation of one or more CCEs, where different code rates for the control channels are realized by aggregating different numbers of CCEs. Before being mapped to REs, the PDCCH complex-valued symbols can be organized into quadruplets, which can then be permuted using a sub-block interleaver for rate matching. Each PDCCH can be transmitted using one or more of these CCEs, where each CCE can correspond to nine sets of four physical REs known as resource element groups (REGs). Four QPSK symbols may be mapped to each REG. The PDCCH can be transmitted using one or more CCEs, depending on the size of the DCI and the channel condition. There can be four or more different PDCCH formats defined with different numbers of CCEs (e.g., aggregation level, L=1, 2, 4, or 8 in LTE and L=1, 2, 4, 8, or 16 in NR).

In some implementations, the RAN nodes 111 can use the PDCCH to schedule DL transmissions on PDSCH and UL transmissions on PUSCH. A DCI message transmitted on PDCCH can include downlink assignments containing a modulation and coding format, resource allocation, and HARQ information related to DL-SCH; and/or uplink scheduling grants containing modulation and coding format, resource allocation, and HARQ information related to UL-SCH. In addition to scheduling, the PDCCH can be used for activation and deactivation of configured PUSCH transmission(s) with a configured grant; activation and deactivation of PDSCH semi-persistent transmission; notifying one or more UEs 101 of a slot format; notifying one or more UEs 101 of the PRB(s) and OFDM symbol(s) where a UE 101 may assume no transmission is intended for the UE; transmission of TPC commands for PUCCH and PUSCH; transmission of one or more TPC commands for SRS transmissions by one or more UEs 101; switching an active BWP for a UE 101; and initiating a random access procedure.

In some implementations, the UE 101 monitors a set of PDCCH candidates on one or more activated serving cells as configured by higher layer signaling for control information (e.g., DCI), where monitoring can include attempting to decode each of the PDCCHs (or PDCCH candidates) in the set according to one or more monitored DCI formats (e.g., DCI formats as described in section 5.3.3 of 3GPP TS 38.212, DCI formats as described in section 7.3 of 3GPP TS 38.212, or the like). The UEs 101 monitor (or attempt to decode) respective sets of PDCCH candidates in one or more configured monitoring occasions according to the corresponding search space configurations.

In NR implementations, the UEs 101 monitor (or attempt to decode) respective sets of PDCCH candidates in one or more configured monitoring occasions in one or more configured CORESETs according to the corresponding search space configurations. A CORESET can include a set of $N_{RB}^{CORESET}$ RBs in the frequency domain and $N_{symb}^{CORESET} \in \{1,2,3\}$ symbols in the time domain. A CORESET can include six REGs numbered in increasing order in a time-first manner, where a REG equals one RB during one OFDM symbol. The UEs 101 can be configured with multiple CORESETS where each CORESET can be associated with one CCE-to-REG mapping. Interleaved and non-interleaved CCE-to-REG mapping are supported in a CORESET. In some implementations, each REG carrying a PDCCH carries its own DMRS.

Figure 2:
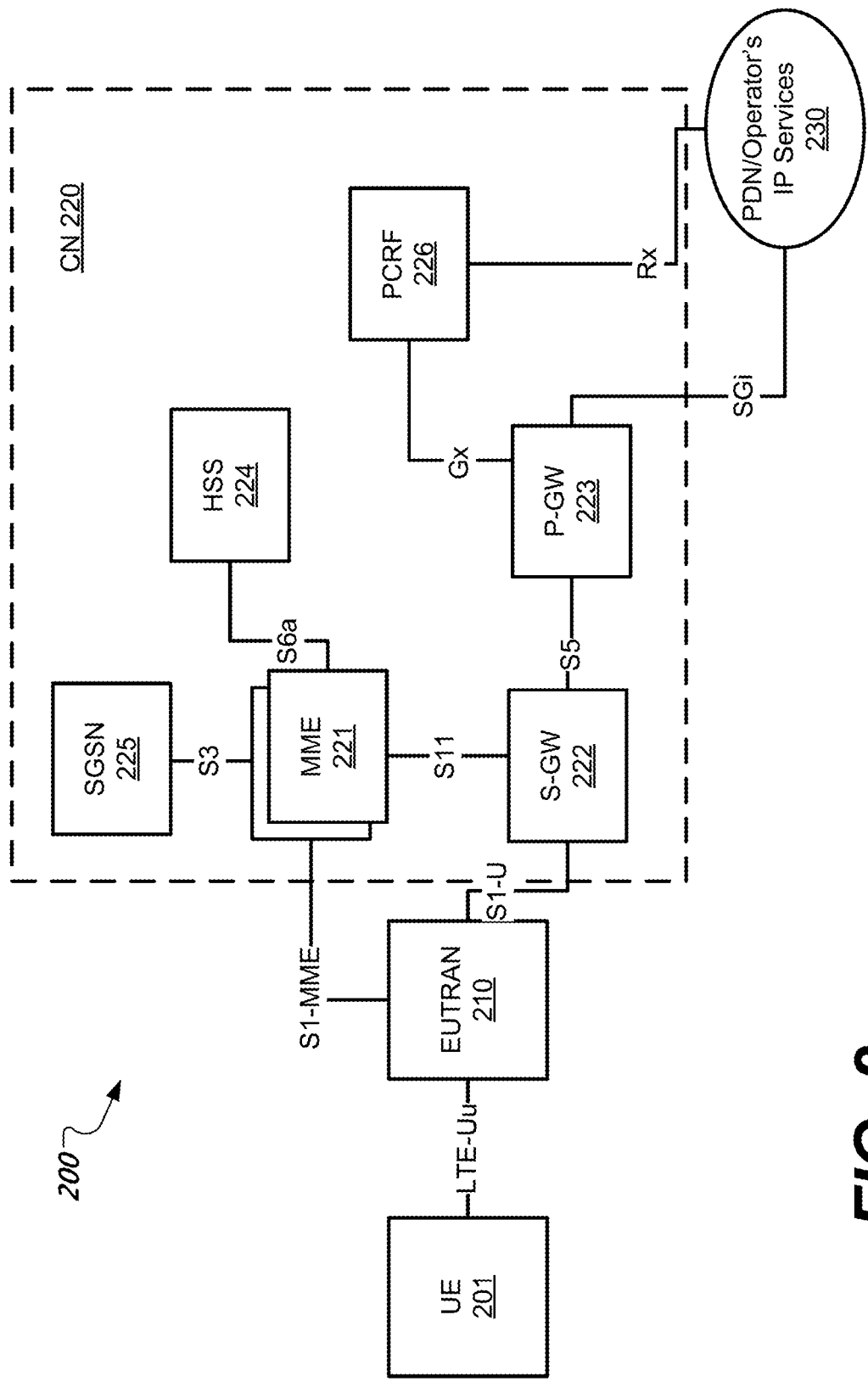
FIG. 2 illustrates an example architecture of a system including a core network.

The RAN nodes 111 are configured to communicate with one another using an interface 112. In examples, such as where the system 100 is an LTE system (e.g., when the core network 120 is an evolved packet core (EPC) network as shown in FIG. 2), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some implementations, the X2 interface can include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

Figure 3:
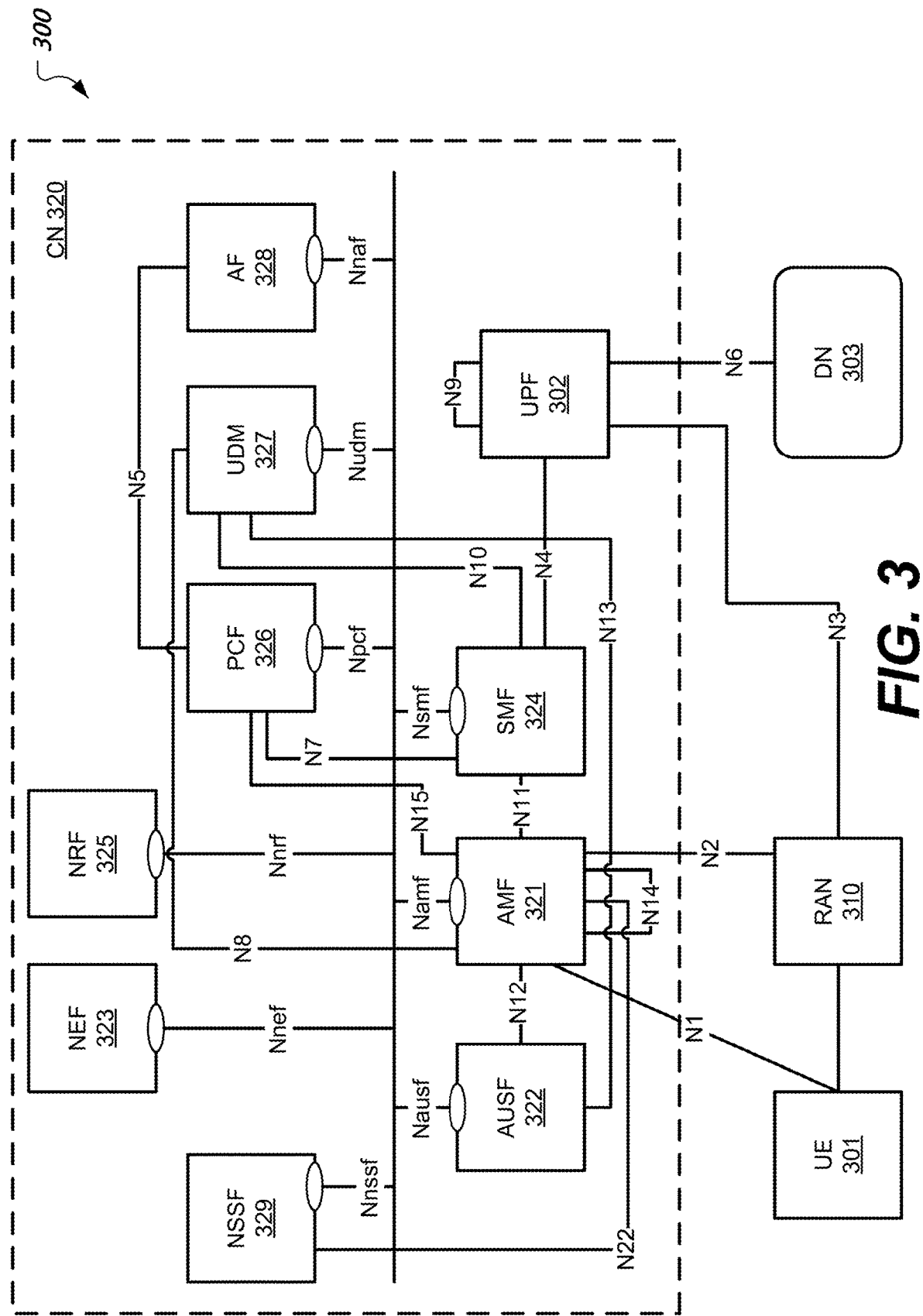
FIG. 3 illustrates another example architecture of a system including a core network.

In some implementations, such as where the system 100 is a 5G NR system (e.g., when the core network 120 is a 5G core network as shown in FIG. 3), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some implementations, the Xn interface can include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support can include context transfer from an old (source) serving RAN node 111 to new (target) serving RAN node 111, and control of user plane tunnels between old (source) serving RAN node 111 to new (target) serving RAN node 111. A protocol stack of the Xn-U can include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack can include an application layer signaling protocol (referred to as Xn Application Protocol (Xn-AP or XnAP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and can include components to read and execute instructions from a machine-readable or computer-readable medium (e.g., a non-transitory machine-readable storage medium). In some implementations, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

An application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120. The application server 130 can use an IP communications interface 125 to communicate with one or more network elements 112.

In some implementations, the CN 120 may be a 5G core network (referred to as "5GC 120" or "5G core network 120"), and the RAN 110 may be connected with the CN 120 using a next generation interface 113. In some implementations, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs). Examples where the CN 120 is a 5G core network are discussed in more detail with regard to FIG. 3.

In some implementations, the CN 120 may be an EPC (referred to as "EPC 120" or the like), and the RAN 110 may be connected with the CN 120 using an S1 interface 113. In some implementations, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

In some implementations, the UEs 101 may directly exchange communication data using an interface 105, such as a ProSe interface. The interface 105 may alternatively be referred to as a sidelink interface 105 and can include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi) router. In this example, the AP 106 is shown to be connected to the Internet without connecting to the core network of the wireless system, as described in further detail below. In various examples, the UE 101b, RAN 110, and AP 106 may be configured to use LTE-WLAN aggregation (LWA) operation or LTW/WLAN radio level integration with IPsec tunnel (LWIP) operation. The LWA operation may involve the UE 101b in RRC_CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

In some implementations, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some implementations, an individual RAN node 111 may represent individual gNB distributed units (DUs) that are connected to a gNB central unit (CU) using individual F1 interfaces (not shown in FIG. 1). In some implementations, the gNB-DUs can include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some implementations, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and can include a network interface controller to provide a wired connection (e.g., Ethernet) to a traffic signal controller or a backhaul network, or both.

FIG. 2 illustrates an example architecture of a system 200 including a first CN 220. In this example, the system 200 may implement the LTE standard such that the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which can include RAN nodes 111 discussed previously. The CN 220 may comprise MMEs 221, an S-GW 222, a PDN gateway (P-GW) 223, a high-speed packet access (HSS) function 224, and a serving GPRS support node (SGSN) 225.

The MMEs 221 may be similar in function to the control plane of legacy SGSN, and may implement mobility management (MM) functions to keep track of the current location of a UE 201. The MMEs 221 may perform various mobility management procedures to manage mobility aspects in access such as gateway selection and tracking area list management. Mobility management (also referred to as "EPS MM" or "EMM" in E-UTRAN systems) may refer to all applicable procedures, methods, data storage, and other aspects that are used to maintain knowledge about a present location of the UE 201, provide user identity confidentiality, or perform other like services to users/subscribers, or combinations of them, among others. Each UE 201 and the MME 221 can include an EMM sublayer, and a mobility management context may be established in the UE 201 and the MME 221 when an attach procedure is successfully completed. The mobility management context may be a data structure or database object that stores mobility management-related information of the UE 201. The MMEs 221 may be coupled with the HSS 224 using a S6a reference point, coupled with the SGSN 225 using a S3 reference point, and coupled with the S-GW 222 using a S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network, among other functions. The S3 reference point between the MMEs 221 and the SGSN 225 may enable user and bearer information exchange for inter-3GPP access network mobility in idle or active states, or both.

The HSS 224 can include a database for network users, including subscription-related information to support the network entities' handling of communication sessions. The EPC 220 can include one or more HSSs 224 depending on the number of mobile subscribers, on the capacity of the equipment, on the organization of the network, or combinations of them, among other features. For example, the HSS 224 can provide support for routing, roaming, authentication, authorization, naming/addressing resolution, location dependencies, among others. A S6a reference point between the HSS 224 and the MMEs 221 may enable transfer of subscription and authentication data for authenticating or authorizing user access to the EPC 220 between HSS 224 and the MMEs 221.

The S-GW 222 may terminate the S1 interface 113 ("S1-U" in FIG. 2) toward the RAN 210, and may route data packets between the RAN 210 and the EPC 220. In addition, the S-GW 222 may be a local mobility anchor point for inter-RAN node handovers and also may provide an anchor for inter-3GPP mobility. Other responsibilities can include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 using a S5 reference point.

The P-GW 223 may terminate a SGi interface toward a PDN 230. The P-GW 223 may route data packets between the EPC 220 and external networks such as a network including the application server 130 (sometimes referred to as an "AF") using an IP communications interface 125 (see, e.g., FIG. 1). In some implementations, the P-GW 223 may be communicatively coupled to an application server (e.g., the application server 130 of FIG. 1 or PDN 230 in FIG. 2) using an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a policy control and charging rules function (PCRF) 226 using a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 using the P-GW 223. The application server 230 may signal the PCRF 226 to indicate a new service flow and select the appropriate quality of service (QoS) and charging parameters. The PCRF 226 may provision this rule into a PCEF (not shown) with the appropriate traffic flow template (TFT) and QoS class identifier (QCI), which commences the QoS and charging as specified by the application server 230. The Gx reference point between the PCRF 226 and the P-GW 223 may allow for the transfer of QoS policy and charging rules from the PCRF 226 to PCEF in the P-GW 223. A Rx reference point may reside between the PDN 230 (or "AF 230") and the PCRF 226.

FIG. 3 illustrates an architecture of a system 300 including a second CN 320. The system 300 is shown to include a UE 301, which may be the same or similar to the UEs 101 and UE 201 discussed previously; a RAN 310, which may be the same or similar to the RAN 110 and RAN 210 discussed previously, and which can include RAN nodes 111 discussed previously; and a data network (DN) 303, which may be, for example, operator services, Internet access or 3rd party services; and a 5GC 320. The 5GC 320 can include an authentication server function (AUSF) 322; an access and mobility management function (AMF) 321; a session management function (SMF) 324; a network exposure function (NEF) 323; a policy control function (PCF) 326; a network repository function (NRF) 325; a unified data management (UDM) function 327; an AF 328; a user plane function (UPF) 302; and a network slice selection function (NSSF) 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 can include an uplink classifier to support routing traffic flows to a data network. The DN 303 may represent various network operator services, Internet access, or third party services. DN 303 can include, or be similar to, application server 130 discussed previously. The UPF 302 may interact with the SMF 324 using a N4 reference point between the SMF 324 and the UPF 302.

The AUSF 322 stores data for authentication of UE 301 and handle authentication-related functionality. The AUSF 322 may facilitate a common authentication framework for various access types. The AUSF 322 may communicate with the AMF 321 using a N12 reference point between the AMF 321 and the AUSF 322, and may communicate with the UDM 327 using a N13 reference point between the UDM 327 and the AUSF 322. Additionally, the AUSF 322 may exhibit a Nausf service-based interface.

The AMF 321 is responsible for registration management (e.g., for registering UE 301), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent pro10 for routing SM messages. AMF 321 may also provide transport for SMS messages between UE 301 and an SMSF (not shown in FIG. 3). AMF 321 may act as security anchor function (SEAF), which can include interaction with the AUSF 322 and the UE 301 to, for example, receive an intermediate key that was established as a result of the UE 301 authentication process. Where universal subscriber identity module (USIM) based authentication is used, the AMF 321 may retrieve the security material from the AUSF 322. AMF 321 may also include a security context management (SCM) function, which receives a key from the SEAF to derive access-network specific keys. Furthermore, AMF 321 may be a termination point of a RAN control plane interface, which can include or be a N2 reference point between the RAN 310 and the AMF 321. In some implementations, the AMF 321 may be a termination point of NAS (N1) signaling and perform NAS ciphering and integrity protection.

AMF 321 may also support NAS signaling with a UE 301 over a N3 inter-working function (IWF) interface (referred to as the "N3IWF"). The N3IWF may be used to provide access to untrusted entities. The N3IWF may be a termination point for the N2 interface between the RAN 310 and the AMF 321 for the control plane, and may be a termination point for the N3 reference point between the RAN 310 and the UPF 302 for the user plane. As such, the AMF 321 may handle N2 signaling from the SMF 324 and the AMF 321 for PDU sessions and QoS, encapsulate/de-encapsulate packets for IPsec and N3 tunneling, mark N3 user-plane packets in the uplink, and enforce QoS corresponding to N3 packet marking taking into account QoS requirements associated with such marking received over N2. The N3IWF may also relay uplink and downlink control-plane NAS signaling between the UE 301 and AMF 321 using a N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit a Namf service-based interface, and may be a termination point for a N14 reference point between two AMFs 321 and a N17 reference point between the AMF 321 and a 5G equipment identity registry (EIR) (not shown in FIG. 3).

The UE 301 may register with the AMF 321 in order to receive network services. Registration management (RM) is used to register or deregister the UE 301 with the network (e.g., AMF 321), and establish a UE context in the network (e.g., AMF 321). The UE 301 may operate in a RM-REGISTERED state or an RM-DEREGISTERED state. In the RM DEREGISTERED state, the UE 301 is not registered with the network, and the UE context in AMF 321 holds no valid location or routing information for the UE 301 so the UE 301 is not reachable by the AMF 321. In the RM REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be, for example, a data structure or database object, among others, that indicates or stores a registration state per access type and the periodic update timer. The AMF 321 may also store a 5GC mobility management (MM) context that may be the same or similar to the (E)MM context discussed previously. In some implementations, the AMF 321 may store a coverage enhancement mode B Restriction parameter of the UE 301 in an associated MM context or RM context. The AMF 321 may also derive the value, when needed, from the UE's usage setting parameter already stored in the UE context (and/or MM/RM context).

Connection management (CM) may be used to establish and release a signaling connection between the UE 301 and the AMF 321 over the N1 interface. The signaling connection is used to enable NAS signaling exchange between the UE 301 and the CN 320, and includes both the signaling connection between the UE and the AN (e.g., RRC connection or UE-N3IWF connection for non-3GPP access) and the N2 connection for the UE 301 between the AN (e.g., RAN 310) and the AMF 321. In some implementations, the UE 301 may operate in one of two CM modes: CM-IDLE mode or CM-CONNECTED mode. When the UE 301 is operating in the CM-IDLE mode, the UE 301 may have no NAS signaling connection established with the AMF 321 over the N1 interface, and there may be RAN 310 signaling connection (e.g., N2 or N3 connections, or both) for the UE 301. When the UE 301 is operating in the CM-CONNECTED mode, the UE 301 may have an established NAS signaling connection with the AMF 321 over the N1 interface, and there may be a RAN 310 signaling connection (e.g., N2 and/or N3 connections) for the UE 301. Establishment of a N2 connection between the RAN 310 and the AMF 321 may cause the UE 301 to transition from the CM-IDLE mode to the CM-CONNECTED mode, and the UE 301 may transition from the CM-CONNECTED mode to the CM-IDLE mode when N2 signaling between the RAN 310 and the AMF 321 is released.

The SMF 324 may be responsible for session management (SM), such as session establishment, modify and release, including tunnel maintain between UPF and AN node; UE IP address allocation and management (including optional authorization); selection and control of UP function; configuring traffic steering at the UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent using AMF over N2 to AN; and determining SSC mode of a session. SM may refer to management of a PDU session, and a PDU session (or "session") may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 can include some or all of the following roaming functionality: handling local enforcement to apply QoS service level agreements (SLAs) (e.g., in VPLMN); charging data collection and charging interface (e.g., in VPLMN); lawful intercept (e.g., in VPLMN for SM events and interface to LI system); and support for interaction with external DN for transport of signaling for PDU session authorization/authentication by external DN. A N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, among others. In some implementations, the NEF 323 may authenticate, authorize, and/or throttle the AFs. The NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, or used for other purposes such as analytics, or both. Additionally, the NEF 323 may exhibit a Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behavior. The PCF 326 may also implement a front end to access subscription information relevant for policy decisions in a unified data repository (UDR) of the UDM 327. The PCF 326 may communicate with the AMF 321 using an N15 reference point between the PCF 326 and the AMF 321, which can include a PCF 326 in a visited network and the AMF 321 in case of roaming scenarios. The PCF 326 may communicate with the AF 328 using a N5 reference point between the PCF 326 and the AF 328; and with the SMF 324 using a N7 reference point between the PCF 326 and the SMF 324. The system 300 or CN 320, or both, may also include a N24 reference point between the PCF 326 (in the home network) and a PCF 326 in a visited network. Additionally, the PCF 326 may exhibit a Npcf service-based interface.

The UDM 327 may handle subscription-related information to support the network entities' handling of communication sessions, and may store subscription data of UE 301. For example, subscription data may be communicated between the UDM 327 and the AMF 321 using a N8 reference point between the UDM 327 and the AMF. The UDM 327 can include two parts, an application front end and a UDR (the front end and UDR are not shown in FIG. 3). The UDR may store subscription data and policy data for the UDM 327 and the PCF 326, or structured data for exposure and application data (including PFDs for application detection, application request information for multiple UEs 301) for the NEF 323, or both. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM can include a UDM front end, which is in charge of processing credentials, location management, subscription management, and so on. Several different front ends may serve the same user in different transactions. The UDM front end accesses subscription information stored in the UDR and performs authentication credential processing, user identification handling, access authorization, registration/mobility management, and subscription management. The UDR may interact with the SMF 324 using a N10 reference point between the UDM 327 and the SMF 324. UDM 327 may also support SMS management, in which an SMS front end implements the similar application logic as discussed previously. Additionally, the UDM 327 may exhibit the Nudm service-based interface.

The AF 328 may provide application influence on traffic routing, provide access to the network capability exposure (NCE), and interact with the policy framework for policy control. The NCE may be a mechanism that allows the 5GC 320 and AF 328 to provide information to each other using NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 using the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit a Naf service-based interface.

The NSSF 329 may select a set of network slice instances serving the UE 301. The NSSF 329 may also determine allowed NSSAI and the mapping to the subscribed single network slice selection assistance information (S-NSSAI), if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 using an N22 reference point between AMF 321 and NSSF 329; and may communicate with another NSSF 329 in a visited network using a N31 reference point (not shown by FIG. 3). Additionally, the NSSF 329 may exhibit a Nnssf service-based interface.

As discussed previously, the CN 320 can include an SMSF, which may be responsible for SMS subscription checking and verification, and relaying SM messages to or from the UE 301 to or from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown in FIG. 3, such as a data storage system, a 5G-EIR, a security edge protection pro10 (SEPP), and the like. The data storage system can include a structured data storage function (SDSF), an unstructured data storage function (UDSF), or both, among others. Any network function may store and retrieve unstructured data to or from the UDSF (e.g., UE contexts), using a N18 reference point between any NF and the UDSF (not shown in FIG. 3). Individual network functions may share a UDSF for storing their respective unstructured data or individual network functions may each have their own UDSF located at or near the individual network functions. Additionally, the UDSF may exhibit a Nudsf service-based interface (not shown in FIG. 3). The 5G-EIR may be a network function that checks the status of permanent equipment identifiers (PEI) for determining whether particular equipment or entities are blacklisted from the network; and the SEPP may be a non-transparent pro10 that performs topology hiding, message filtering, and policing on inter-PLMN control plane interfaces.

In some implementations, there may be additional or alternative reference points or service-based interfaces, or both, between the network function services in the network functions. However, these interfaces and reference points have been omitted from FIG. 3 for clarity. In one example, the CN 320 can include an Nx interface, which is an inter-CN interface between the MME (e.g., MME 221) and the AMF 321 in order to enable interworking between CN 320 and CN 220. Other example interfaces or reference points can include a N5g-EIR service-based interface exhibited by a 5G-EIR, a N27 reference point between the NRF in the visited network and the NRF in the home network, or a N31 reference point between the NSSF in the visited network and the NSSF in the home network, among others.

In some implementations, the components of the CN 220 may be implemented in one physical node or separate physical nodes and can include components to read and execute instructions from a machine-readable or computer-readable medium (e.g., a non-transitory machine-readable storage medium). In some implementations, the components of CN 320 may be implemented in a same or similar manner as discussed herein with regard to the components of CN 220. In some implementations, NFV is utilized to virtualize any or all of the above-described network node functions using executable instructions stored in one or more computer-readable storage mediums, as described in further detail below. A logical instantiation of the CN 220 may be referred to as a network slice, and individual logical instantiations of the CN 220 may provide specific network capabilities and network characteristics. A logical instantiation of a portion of the CN 220 may be referred to as a network sub-slice, which can include the P-GW 223 and the PCRF 226.

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice can include a RAN part and a CN part. The support of network slicing relies on the principle that traffic for different slices is handled by different PDU sessions. The network can realize the different network slices by scheduling or by providing different L1/L2 configurations, or both. The UE 301 provides assistance information for network slice selection in an appropriate RRC message if it has been provided by NAS. In some implementations, while the network can support large number of slices, the UE need not support more than 8 slices simultaneously.

A network slice can include the CN 320 control plane and user plane NFs, NG-RANs 310 in a serving PLMN, and a N3IWF functions in the serving PLMN. Individual network slices may have different S-NSSAI or different SSTs, or both. NSSAI includes one or more S-NSSAIs, and each network slice is uniquely identified by an S-NSSAI. Network slices may differ for supported features and network functions optimizations. In some implementations, multiple network slice instances may deliver the same services or features but for different groups of UEs 301 (e.g., enterprise users). For example, individual network slices may deliver different committed service(s) or may be dedicated to a particular customer or enterprise, or both. In this example, each network slice may have different S-NSSAIs with the same SST but with different slice differentiators. Additionally, a single UE may be served with one or more network slice instances simultaneously using a 5G AN, and the UE may be associated with eight different S-NSSAIs. Moreover, an AMF 321 instance serving an individual UE 301 may belong to each of the network slice instances serving that UE.

Network slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that comprise each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node may support multiple slices, and the NG-RAN 310 may also apply an appropriate RRM policy for the SLA in place to each supported slice. The NG-RAN 310 may also support QoS differentiation within a slice.

The NG-RAN 310 may also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which may be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation may be achieved by means of RRM policies and protection mechanisms that should avoid that shortage of shared resources if one slice breaks the service level agreement for another slice. In some implementations, it is possible to fully dedicate NG-RAN 310 resources to a certain slice. How NG-RAN 310 supports resource isolation is implementation dependent.

Some slices may be available only in part of the network. Awareness in the NG-RAN 310 of the slices supported in the cells of its neighbors may be beneficial for inter-frequency mobility in connected mode. The slice availability may not change within the UE's registration area. The NG-RAN 310 and the 5GC 320 are responsible to handle a service request for a slice that may or may not be available in a given area. Admission or rejection of access to a slice may depend on factors such as support for the slice, availability of resources, support of the requested service by NG-RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Context Setup Request message, the NG-RAN 310 may be allowed to apply some provisional or local policies based on awareness of a particular slice that the UE 301 is requesting to access. During the initial context setup, the NG-RAN 310 is informed of the slice for which resources are being requested.

Figure 4:
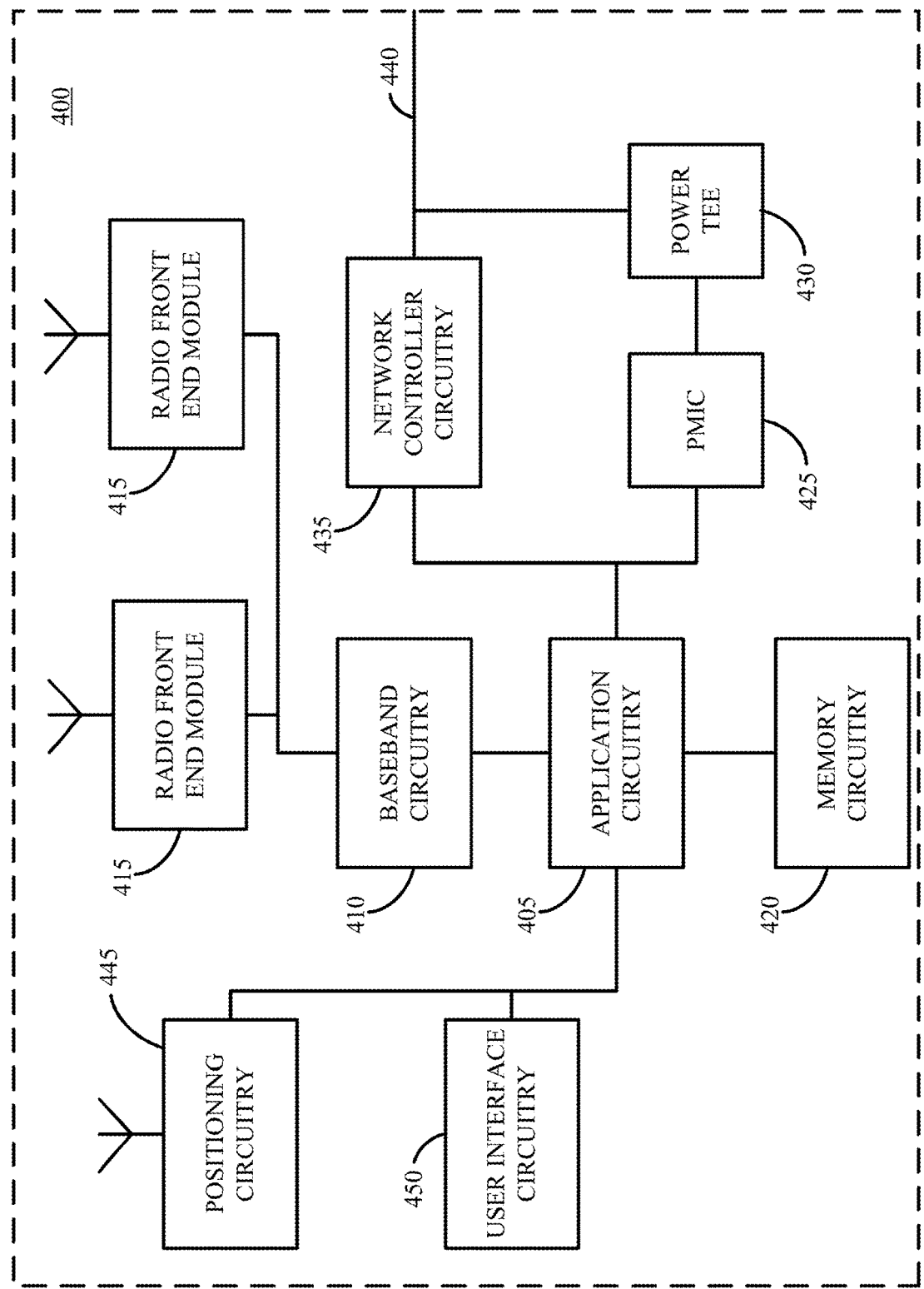
FIG. 4 illustrates an example of infrastructure equipment.

FIG. 4 illustrates an example of infrastructure equipment 400. The infrastructure equipment 400 (or "system 400") may be implemented as a base station, a radio head, a RAN node, such as the RAN nodes 111 or AP 106 shown and described previously, an application server 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some implementations, the system 400 can include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for CRAN, vBBU, or other implementations.

The application circuitry 405 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers, Universal Serial Bus (USB) interfaces, Mobile Industry Processor Interface (MIPI) interfaces, and Joint Test Access Group (JTAG) test access ports. The processors (or cores) of the application circuitry 405 may be coupled with or can include memory or storage elements and may be configured to execute instructions stored in the memory or storage to enable various applications or operating systems to run on the system 400. In some implementations, the memory or storage elements can include on-chip memory circuitry, which can include any suitable volatile or non-volatile memory, such as DRAM, SRAM, EPROM, EEPROM, Flash memory, solid-state memory, or combinations of them, among other types of memory.

The processor(s) of the application circuitry 405 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some implementations, the application circuitry 405 can include, or may be, a special-purpose processor or controller configured to carry out the various techniques described here.

The baseband circuitry 410 may be implemented, for example, as a solder-down substrate including one or more integrated circuits, a single packaged integrated circuit soldered to a main circuit board or a multi-chip module containing two or more integrated circuits. The user interface circuitry 450 can include one or more user interfaces designed to enable user interaction with the system 400 or peripheral component interfaces designed to enable peripheral component interaction with the system 400. User interfaces can include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces can include, but are not limited to, a nonvolatile memory port, a universal serial bus (USB) port, an audio jack, a power supply interface, among others.

The radio front end modules (RFEMs) 415 can include a millimeter wave (mmWave) RFEM and one or more sub-mmWave radio frequency integrated circuits (RFICs). In some implementations, the one or more sub-mmWave RFICs may be physically separated from the mmWave RFEM. The RFICs can include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 415, which incorporates both mmWave antennas and sub-mmWave.

The memory circuitry 420 can include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. Memory circuitry 420 may be implemented as one or more of solder down packaged integrated circuits, socketed memory modules and plug-in memory cards, for example.

The PMIC 425 can include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 can include one or more dedicated processors or FPGAs, or both, to communicate using one or more of the aforementioned protocols. In some implementations, the network controller circuitry 435 can include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 445 can include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

The components shown by FIG. 4 may communicate with one another using interface circuitry, which can include any number of bus or interconnect (IX) technologies such as industry standard architecture (ISA), extended ISA (EISA), peripheral component interconnect (PCI), peripheral component interconnect extended (PCIx), PCI express (PCIe), or any number of other technologies. The bus or IX may be a proprietary bus, for example, used in a SoC based system. Other bus or IX systems may be included, such as an I2C interface, an SPI interface, point to point interfaces, and a power bus, among others.

Figure 5:
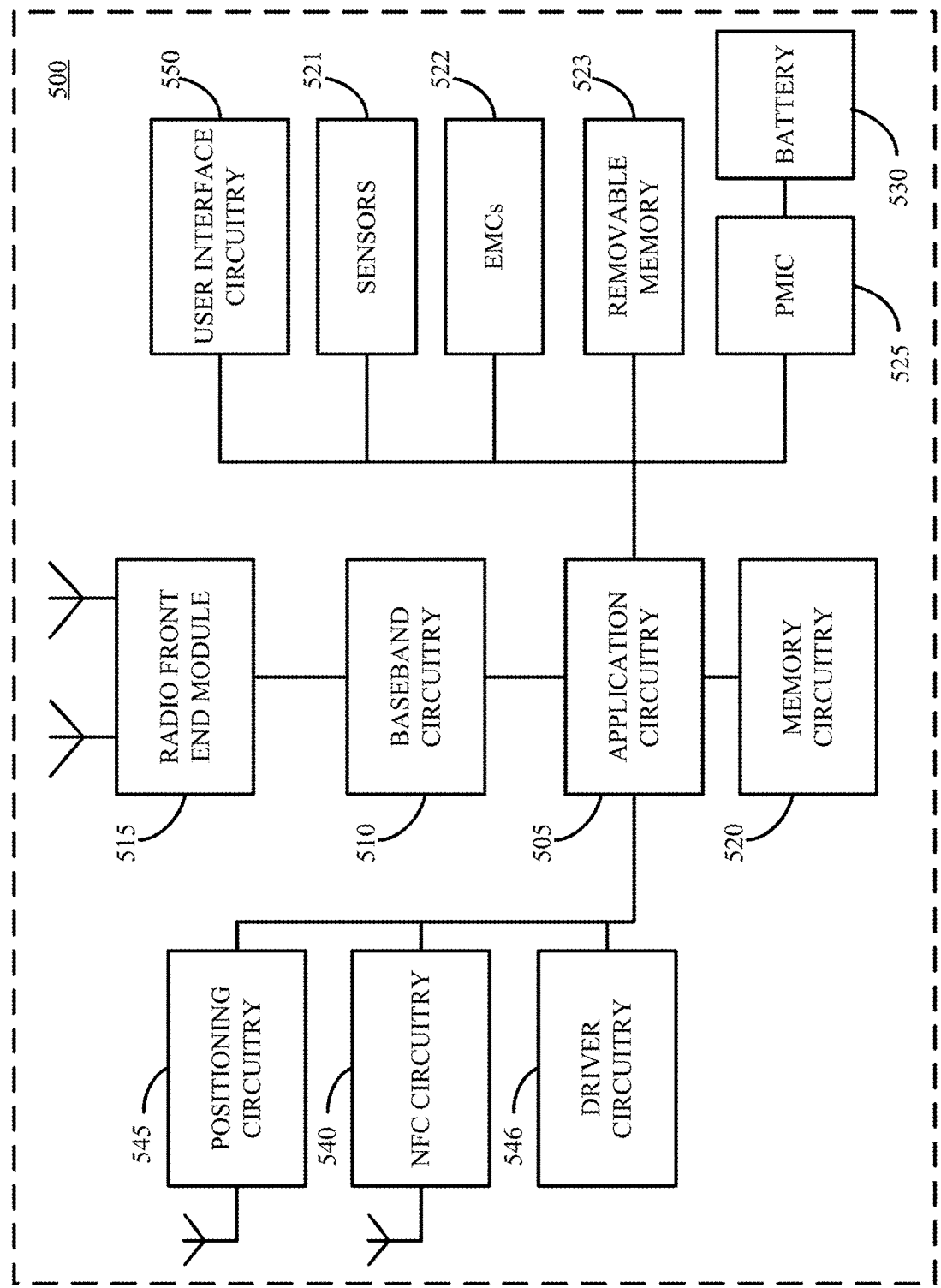
FIG. 5 illustrates an example of a platform or device.

FIG. 5 illustrates an example of a platform 500 (or "device 500"). In some implementations, the computer platform 500 may be suitable for use as UEs 101, 201, 301, application servers 130, or any other component or device discussed herein. The platform 500 can include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 5 is intended to show a high level view of components of the platform 500. However, in some implementations, the platform 500 can include fewer, additional, or alternative components, or a different arrangement of the components shown in FIG. 5.

The application circuitry 505 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or can include memory/storage elements and may be configured to execute instructions stored in the memory or storage to enable various applications or operating systems to run on the system 500. In some implementations, the memory or storage elements may be on-chip memory circuitry, which can include any suitable volatile or non-volatile memory, such as DRAM, SRAM, EPROM, EEPROM, Flash memory, solid-state memory, or combinations of them, among other types of memory.

The processor(s) of application circuitry 505 can include, for example, one or more processor cores, one or more application processors, one or more GPUs, one or more RISC processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry 405 can include, or may be, a special-purpose processor/controller to carry out the techniques described herein. In some implementations, the application circuitry 505 may be a part of a system on a chip (SoC) in which the application circuitry 505 and other components are formed into a single integrated circuit, or a single package. In some implementations, the application circuitry 505 can include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some implementations, the application circuitry 505 can include logic blocks or logic fabric, and other interconnected resources that may be programmed to perform various functions, such as the procedures, methods, functions described herein. In some implementations, the application circuitry 505 can include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 6.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs can include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 515, which incorporates both mmWave antennas and sub-mmWave. In some implementations, the RFEMs 515, the baseband circuitry 510, or both are included in a transceiver of the platform 500.

The memory circuitry 520 may include any number and type of memory devices used to provide for a given amount of system memory. As examples, the memory circuitry 520 may include one or more of volatile memory, such as RAM, DRAM, or SDRAM, and NVM, such as high-speed electrically erasable memory (commonly referred to as Flash memory), PRAM, or MRAM, or combinations of them, among others. In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, for example, a solid state drive (SSD), hard disk drive (HDD), a micro HDD, resistance change memories, phase change memories, holographic memories, or chemical memories, among others.

In low power implementations, the memory circuitry 520 may be on-die memory or registers associated with the application circuitry 505. To provide for persistent storage of information such as data, applications, operating systems and so forth, memory circuitry 520 can include one or more mass storage devices, which can include, for example, a solid state drive (SSD), hard disk drive (HDD), a micro HDD, resistance change memories, phase change memories, holographic memories, or chemical memories, among others.

The removable memory circuitry 523 can include devices, circuitry, enclosures, housings, ports or receptacles, among others, used to couple portable data storage devices with the platform 500. These portable data storage devices may be used for mass storage purposes, and can include, for example, flash memory cards (e.g., Secure Digital (SD) cards, microSD cards, xD picture cards), and USB flash drives, optical discs, or external HDDs, or combinations of them, among others.

The platform 500 may also include interface circuitry (not shown) for connecting external devices with the platform 500. The external devices connected to the platform 500 using the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electro-mechanical components. In some implementations, the platform 500 is configured to operate one or more EMCs 522 based on one or more captured events, instructions, or control signals received from a service provider or clients, or both.

In some implementations, the interface circuitry may connect the platform 500 with positioning circuitry 545. The positioning circuitry 545 includes circuitry to receive and decode signals transmitted or broadcasted by a positioning network of a GNSS. In some implementations, the positioning circuitry 545 can include a Micro-PNT IC that uses a master timing clock to perform position tracking or estimation without GNSS assistance. The positioning circuitry 545 may also be part of, or interact with, the baseband circuitry 410 or RFEMs 515, or both, to communicate with the nodes and components of the positioning network. The positioning circuitry 545 may also provide data (e.g., position data, time data) to the application circuitry 505, which may use the data to synchronize operations with various infrastructure (e.g., radio base stations), for turn-by-turn navigation applications, or the like.

In some implementations, the interface circuitry may connect the platform 500 with Near-Field Communication (NFC) circuitry 540. The NFC circuitry 540 is configured to provide contactless, short-range communications based on radio frequency identification (RFID) standards, in which magnetic field induction is used to enable communication between NFC circuitry 540 and NFC-enabled devices external to the platform 500 (e.g., an "NFC touchpoint"). The NFC circuitry 540 includes an NFC controller coupled with an antenna element and a processor coupled with the NFC controller. The NFC controller may be a chip or IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 can include software and hardware elements that operate to control particular devices that are embedded in the platform 500, attached to the platform 500, or otherwise communicatively coupled with the platform 500. The driver circuitry 546 can include individual drivers allowing other components of the platform 500 to interact with or control various input/output (I/O) devices that may be present within, or connected to, the platform 500. For example, the driver circuitry 546 can include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some implementations, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC Idle state, where it disconnects from the network and does not perform operations such as channel quality feedback or handover. This can allow the platform 500 to enter a very low power state, where it periodically wakes up to listen to the network and then powers down again. In some implementations, the platform 500 may not receive data in the RRC Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although, in some implementations the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others. In some implementations, such as in V2X applications, the battery 530 may be a typical lead-acid automotive battery.

The user interface circuitry 550 includes various input/output (I/O) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry can include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Crystal Displays (LCD), LED displays, quantum dot displays, or projectors), with the output of characters, graphics, or multimedia objects being generated or produced from the operation of the platform 500. The output device circuitry may also include speakers or other audio emitting devices, or printer(s). In some implementations, the sensor circuitry 521 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces can include, but are not limited to, a non-volatile memory port, a USB port, an audio jack, or a power supply interface.

Although not shown, the components of platform 500 may communicate with one another using a suitable bus or interconnect (IX) technology, which can include any number of technologies, including ISA, EISA, PCI, PCIx, PCIe, a Time-Trigger Protocol (TTP) system, a FlexRay system, or any number of other technologies. The bus or IX may be a proprietary bus or IX, for example, used in a SoC based system. Other bus or IX systems may be included, such as an I2C interface, an SPI interface, point-to-point interfaces, and a power bus, among others.

Figure 6:
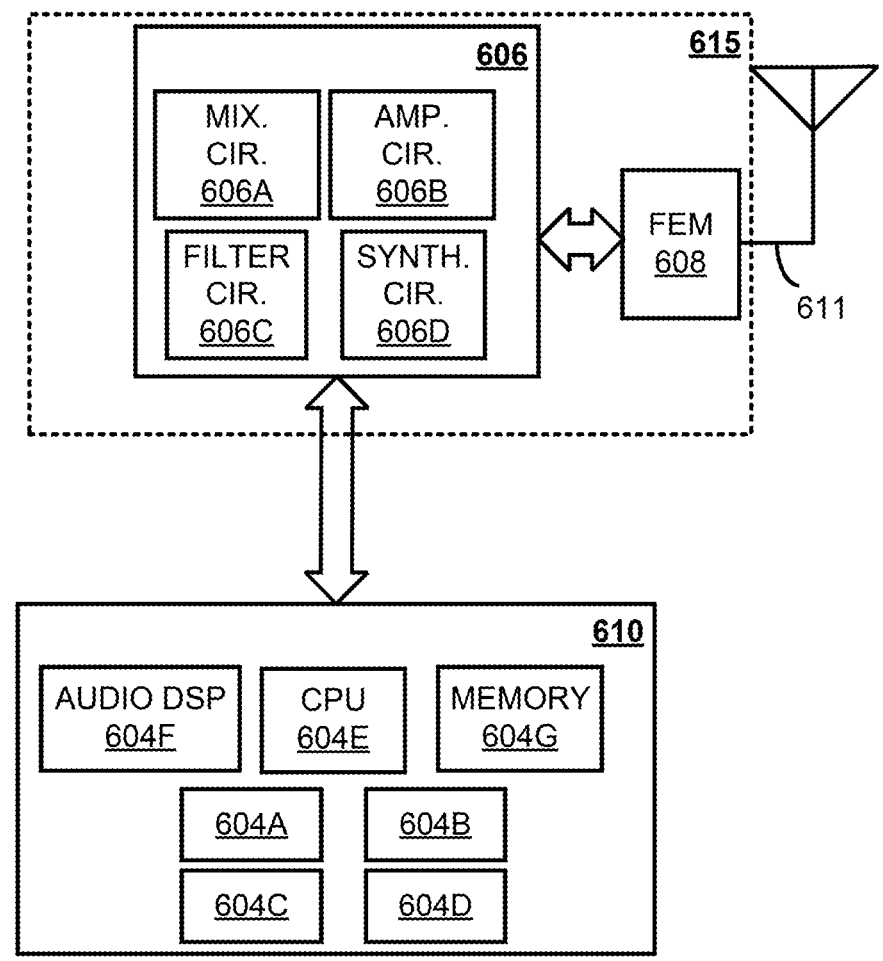
FIG. 6 illustrates example components of baseband circuitry and radio front end circuitry.

FIG. 6 illustrates example components of baseband circuitry 610 and radio front end modules (RFEM) 615. The baseband circuitry 610 can correspond to the baseband circuitry 410 and 510 of FIGS. 4 and 5, respectively. The RFEM 615 can correspond to the RFEM 415 and 515 of FIGS. 4 and 5, respectively. As shown, the RFEMs 615 can include Radio Frequency (RF) circuitry 606, front-end module (FEM) circuitry 608, and antenna array 611 coupled together. In some implementations, the RFEMs 615, the baseband circuitry 610, or both are included in a transceiver.

The baseband circuitry 610 includes circuitry configured to carry out various radio or network protocol and control functions that enable communication with one or more radio networks using the RF circuitry 606. The radio control functions can include, but are not limited to, signal modulation and demodulation, encoding and decoding, and radio frequency shifting. In some implementations, modulation and demodulation circuitry of the baseband circuitry 610 can include Fast-Fourier Transform (FFT), precoding, or constellation mapping and demapping functionality. In some implementations, encoding and decoding circuitry of the baseband circuitry 610 can include convolution, tail-biting convolution, turbo, Viterbi, or Low Density Parity Check (LDPC) encoder and decoder functionality. Modulation and demodulation and encoder and decoder functionality are not limited to these examples and can include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 4 and 5) for generation and processing of the baseband signals and for controlling operations of the RF circuitry 606. The baseband circuitry 610 may handle various radio control functions.

The aforementioned circuitry and control logic of the baseband circuitry 610 can include one or more single or multi-core processors. For example, the one or more processors can include a 3G baseband processor 604A, a 4G or LTE baseband processor 604B, a 5G or NR baseband processor 604C, or some other baseband processor(s) 604D for other existing generations, generations in development or to be developed in the future (e.g., sixth generation (6G)). In some implementations, some or all of the functionality of baseband processors 604A-D may be included in modules stored in the memory 604G and executed using one or more processors such as a Central Processing Unit (CPU) 604E. In some implementations, some or all of the functionality of baseband processors 604A-D may be provided as hardware accelerators (e.g., FPGAs or ASICs) loaded with the appropriate bit streams or logic blocks stored in respective memory cells. In some implementations, the memory 604G may store program code of a real-time OS (RTOS) which, when executed by the CPU 604E (or other processor), is to cause the CPU 604E (or other processor) to manage resources of the baseband circuitry 610, schedule tasks, or carry out other operations. In some implementations, the baseband circuitry 610 includes one or more audio digital signal processors (DSP) 604F. An audio DSP 604F can include elements for compression and decompression and echo cancellation and can include other suitable processing elements.

In some implementations, each of the processors 604A-604E can include respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 4 and 5); an RF circuitry interface to send and receive data to and from RF circuitry 606 of FIG. 6; a wireless hardware connectivity interface to send and receive data to and from one or more wireless hardware elements (e.g., Near Field Communication (NFC) components, Bluetooth®/Bluetooth® Low Energy components, Wi-Fi components, and/or the like); and a power management interface to send and receive power or control signals to and from the PMIC 525.

In some implementations (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems can include a bus system, point-to-point connections, network-on-chip (NOC) structures, or some other suitable bus or interconnect technology, such as those discussed herein. The audio subsystem can include DSP circuitry, buffer memory, program memory, speech processing accelerator circuitry, data converter circuitry such as analog-to-digital and digital-to-analog converter circuitry, analog circuitry including one or more of amplifiers and filters, among other components. In some implementations, the baseband circuitry 610 can include protocol processing circuitry with one or more instances of control circuitry (not shown) to provide control functions for the digital baseband circuitry or radio frequency circuitry (e.g., the radio front end modules 615).

In some implementations, the baseband circuitry 610 includes individual processing device(s) to operate one or more wireless communication protocols (e.g., a "multi-protocol baseband processor" or "protocol processing circuitry") and individual processing device(s) to implement PHY layer functions. In some implementations, the PHY layer functions include the aforementioned radio control functions. In some implementations, the protocol processing circuitry operates or implements various protocol layers or entities of one or more wireless communication protocols. For example, the protocol processing circuitry may operate LTE protocol entities or 5G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some implementations, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry can include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some implementations, the components of the baseband circuitry 610 may be suitably combined in a single chip or chipset, or disposed on a same circuit board. In some implementations, some or all of the constituent components of the baseband circuitry 610 and RF circuitry 606 may be implemented together such as, for example, a system on a chip (SoC) or System-in-Package (SiP). In some implementations, some or all of the constituent components of the baseband circuitry 610 may be implemented as a separate SoC that is communicatively coupled with and RF circuitry 606 (or multiple instances of RF circuitry 606). In some implementations, some or all of the constituent components of the baseband circuitry 610 and the application circuitry 405, 505 may be implemented together as individual SoCs mounted to a same circuit board (e.g., a "multi-chip package").

In some implementations, the baseband circuitry 610 may provide for communication compatible with one or more radio technologies. For example, the baseband circuitry 610 may support communication with an E-UTRAN or other WMAN, a WLAN, or a WPAN. Examples in which the baseband circuitry 610 is configured to support radio communications of more than one wireless protocol may be referred to as multi-mode baseband circuitry.

The RF circuitry 606 may enable communication with wireless networks using modulated electromagnetic radiation through a non-solid medium. In some implementations, the RF circuitry 606 can include switches, filters, or amplifiers, among other components, to facilitate the communication with the wireless network. The RF circuitry 606 can include a receive signal path, which can include circuitry to down-convert RF signals received from the FEM circuitry 608 and provide baseband signals to the baseband circuitry 610. The RF circuitry 606 may also include a transmit signal path, which can include circuitry to up-convert baseband signals provided by the baseband circuitry 610 and provide RF output signals to the FEM circuitry 608 for transmission.

The receive signal path of the RF circuitry 606 includes mixer circuitry 606*a*, amplifier circuitry 606*b* and filter circuitry 606*c*. In some implementations, the transmit signal path of the RF circuitry 606 can include filter circuitry 606*c* and mixer circuitry 606*a*. The RF circuitry 606 also includes synthesizer circuitry 606*d* for synthesizing a frequency for use by the mixer circuitry 606*a* of the receive signal path and the transmit signal path. In some implementations, the mixer circuitry 606*a* of the receive signal path may be configured to down-convert RF signals received from the FEM circuitry 608 based on the synthesized frequency provided by synthesizer circuitry 606*d*. The amplifier circuitry 606*b* may be configured to amplify the down-converted signals and the filter circuitry 606*c* may be a low-pass filter (LPF) or band-pass filter (BPF) configured to remove unwanted signals from the down-converted signals to generate output baseband signals. Output baseband signals may be provided to the baseband circuitry 610 for further processing. In some implementations, the output baseband signals may be zero-frequency baseband signals, although this is not a requirement. In some implementations, the mixer circuitry 606*a* of the receive signal path may comprise passive mixers.

In some implementations, the mixer circuitry 606*a* of the transmit signal path may be configured to up-convert input baseband signals based on the synthesized frequency provided by the synthesizer circuitry 606*d* to generate RF output signals for the FEM circuitry 608. The baseband signals may be provided by the baseband circuitry 610 and may be filtered by filter circuitry 606*c*.

In some implementations, the mixer circuitry 606*a* of the receive signal path and the mixer circuitry 606*a* of the transmit signal path can include two or more mixers and may be arranged for quadrature downconversion and upconversion, respectively. In some implementations, the mixer circuitry 606*a* of the receive signal path and the mixer circuitry 606*a* of the transmit signal path can include two or more mixers and may be arranged for image rejection (e.g., Hartley image rejection). In some implementations, the mixer circuitry 606*a* of the receive signal path and the mixer circuitry 606*a* of the transmit signal path may be arranged for direct downconversion and direct upconversion, respectively. In some implementations, the mixer circuitry 606*a* of the receive signal path and the mixer circuitry 606*a* of the transmit signal path may be configured for super-heterodyne operation.

In some implementations, the output baseband signals and the input baseband signals may be analog baseband signals. In some implementations, the output baseband signals and the input baseband signals may be digital baseband signals, and the RF circuitry 606 can include analog-to-digital converter (ADC) and digital-to-analog converter (DAC) circuitry and the baseband circuitry 610 can include a digital baseband interface to communicate with the RF circuitry 606. In some dual-mode examples, a separate radio IC circuitry may be provided for processing signals for each spectrum, although the techniques described here are not limited in this respect.

The synthesizer circuitry 606*d* may be configured to synthesize an output frequency for use by the mixer circuitry 606*a* of the RF circuitry 606 based on a frequency input and a divider control input. In some implementations, the synthesizer circuitry 606*d* may be a fractional N/N+1 synthesizer. In some implementations, frequency input may be provided by a voltage controlled oscillator (VCO), although that is not a requirement. Divider control input may be provided by either the baseband circuitry 610 or the application circuitry 405/505 depending on the desired output frequency. In some implementations, a divider control input (e.g., N) may be determined from a look-up table based on a channel indicated by the application circuitry 405, 505.

The synthesizer circuitry 606*d* of the RF circuitry 606 can include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some implementations, the DLL can include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 606d may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 606 can include an IQ or polar converter.

The FEM circuitry 608 can include a receive signal path, which can include circuitry configured to operate on RF signals received from antenna array 611, amplify the received signals and provide the amplified versions of the received signals to the RF circuitry 606 for further processing. The FEM circuitry 608 may also include a transmit signal path, which can include circuitry configured to amplify signals for transmission provided by the RF circuitry 606 for transmission by one or more of antenna elements of antenna array 611. The amplification through the transmit or receive signal paths may be done solely in the RF circuitry 606, solely in the FEM circuitry 608, or in both the RF circuitry 606 and the FEM circuitry 608.

In some implementations, the FEM circuitry 608 can include a TX/RX switch to switch between transmit mode and receive mode operation. The FEM circuitry 608 can include a receive signal path and a transmit signal path. The receive signal path of the FEM circuitry 608 can include an LNA to amplify received RF signals and provide the amplified received RF signals as an output (e.g., to the RF circuitry 606). The transmit signal path of the FEM circuitry 608 can include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
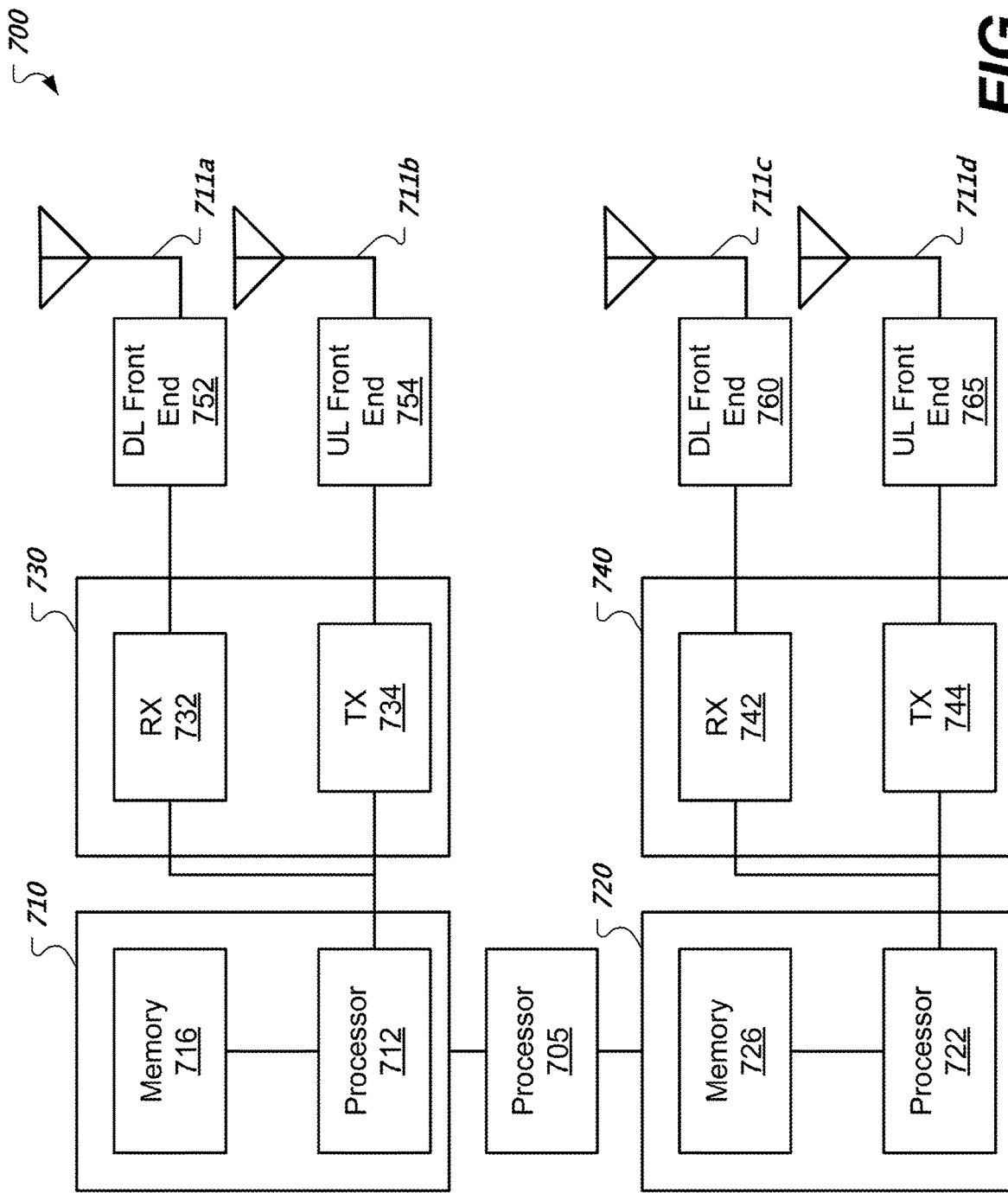
FIG. 7 illustrates example components of cellular communication circuitry.

FIG. 7 illustrates example components of communication circuitry 700. In some implementations, the communication circuitry 700 may be implemented as part of the system 400 or the platform 500 shown in FIGS. 4 and 5. The communication circuitry 700 may be communicatively coupled (e.g., directly or indirectly) to one or more antennas, such as antennas 711a, 711b, 711c, and 711d. In some implementations, the communication circuitry 700 includes or is communicatively coupled to dedicated receive chains, processors, or radios, or combinations of them, for multiple RATs (e.g., a first receive chain for LTE and a second receive chain for 5G NR). For example, as shown in FIG. 7, the communication circuitry 700 includes a modem 710 and a modem 720, which may correspond to or be a part of the baseband circuitry 410 and 510 of FIGS. 4 and 5. The modem 710 may be configured for communications according to a first RAT, such as LTE or LTE-A, and the modem 720 may be configured for communications according to a second RAT, such as 5G NR. In some implementations, a processor 705, such as an application processor can interface with the modems 710, 720.

The modem 710 includes one or more processors 712 and a memory 716 in communication with the processors 712. The modem 710 is in communication with a radio frequency (RF) front end 730, which may correspond to or be a part of to the RFEM 415 and 515 of FIGS. 4 and 5. The RF front end 730 can include circuitry for transmitting and receiving radio signals. For example, the RF front end 730 includes receive circuitry (RX) 732 and transmit circuitry (TX) 734. In some implementations, the receive circuitry 732 is in communication with a DL front end 752, which can include circuitry for receiving radio signals from one or more antennas 711a. The transmit circuitry 734 is in communication with a UL front end 754, which is coupled with one or more antennas 711b.

Similarly, the modem 720 includes one or more processors 722 and a memory 726 in communication with the one or more processors 722. The modem 720 is in communication with an RF front end 740, which may correspond to or be a part of to the RFEM 415 and 515 of FIGS. 4 and 5. The RF front end 740 can include circuitry for transmitting and receiving radio signals. For example, the RF front end 740 includes receive circuitry 742 and transmit circuitry 744. In some implementations, the receive circuitry 742 is in communication with a DL front end 760, which can include circuitry for receiving radio signals from one or more antennas 711c. The transmit circuitry 744 is in communication with a UL front end 765, which is coupled with one or more antennas 711d. In some implementations, one or more front-ends can be combined. For example, a RF switch can selectively couple the modems 710, 720 to a single UL front end 772 for transmitting radio signals using one or more antennas.

The modem 710 can include hardware and software components for time division multiplexing UL data (e.g., for NSA NR operations), as well as the various other techniques described herein. The processors 712 can include one or more processing elements configured to implement various features described herein, such as by executing program instructions stored on the memory 716 (e.g., anon-transitory computer-readable memory medium). In some implementations, the processor 712 may be configured as a programmable hardware element, such as a FPGA or an ASIC. In some implementations, the processors 712 can include one or more ICs that are configured to perform the functions of processors 712. For example, each IC can include circuitry configured to perform the functions of processors 712.

The modem 720 can include hardware and software components for time division multiplexing UL data (e.g., for NSA NR operations), as well as the various other techniques described herein. The processors 722 can include one or more processing elements configured to implement various features described herein, such as by executing instructions stored on the memory 726 (e.g., a non-transitory computer-readable memory medium). In some implementations, the processor 722 may be configured as a programmable hardware element, such as a FPGA or an ASIC. In some implementations, the processor 722 can include one or more ICs that are configured to perform the functions of processors 722.

Figure 8:
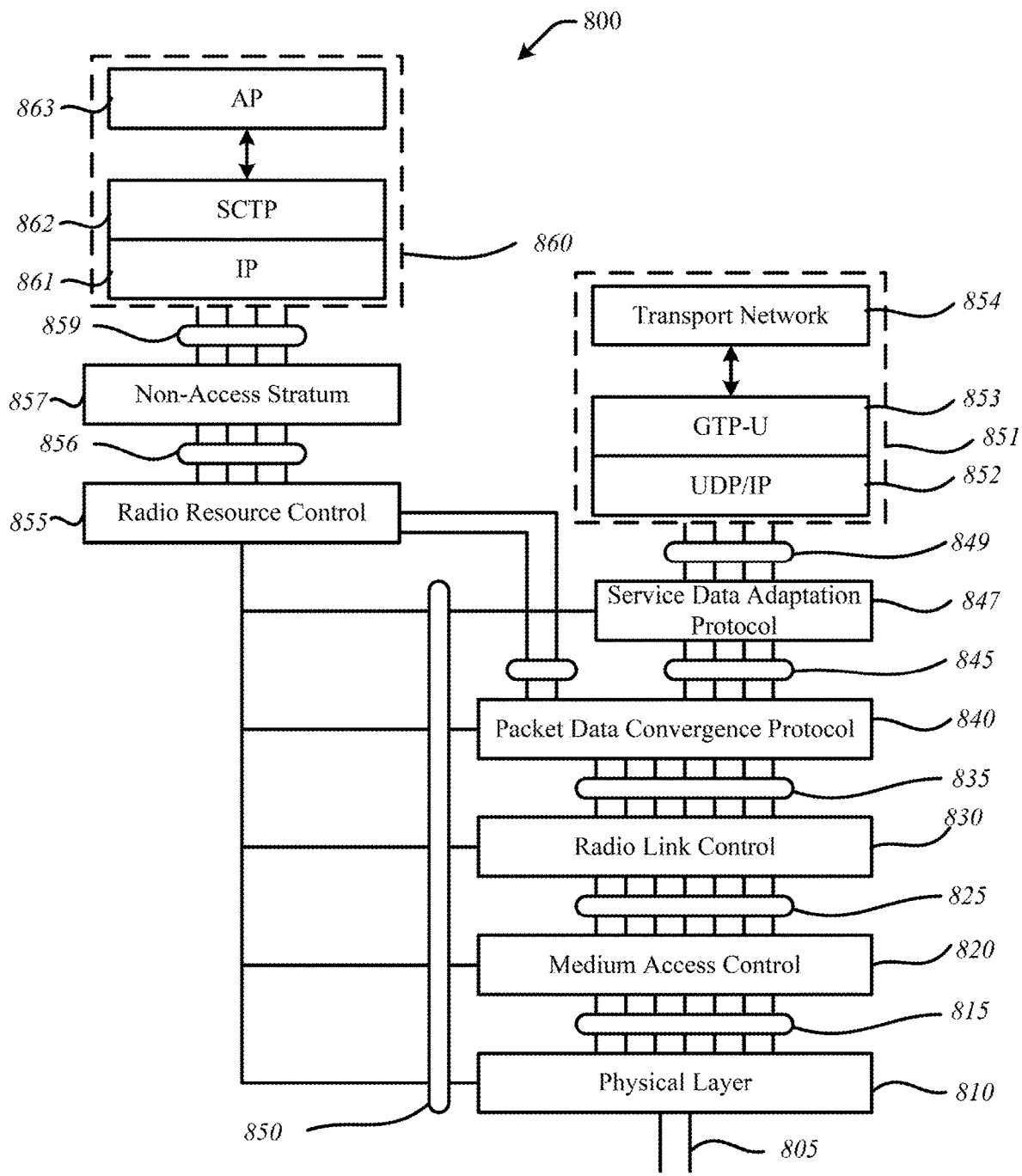
FIG. 8 illustrates example protocol functions that may be implemented in wireless communication systems.

FIG. 8 illustrates various protocol functions that may be implemented in a wireless communication device. In particular, FIG. 8 includes an arrangement 800 showing interconnections between various protocol layers/entities. The following description of FIG. 8 is provided for various protocol layers and entities that operate in conjunction with the 5G NR system standards and the LTE system standards, but some or all of the aspects of FIG. 8 may be applicable to other wireless communication network systems as well.

The protocol layers of arrangement 800 can include one or more of PHY 810, MAC 820, RLC 830, PDCP 840, SDAP 847, RRC 855, and NAS layer 857, in addition to other higher layer functions not illustrated. The protocol layers can include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 can include one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding and decoding of the transport channels, modulation and demodulation of physical channels, interleaving, rate matching, mapping onto physical channels, and MIMO antenna processing. In some implementations, an instance of PHY 810 may process requests from and provide indications to an instance of MAC 820 using one or more PHY-SAP 815. In some implementations, requests and indications communicated using PHY-SAP 815 may comprise one or more transport channels.

Instance(s) of MAC 820 may process requests from, and provide indications to, an instance of RLC 830 using one or more MAC-SAPs 825. These requests and indications communicated using the MAC-SAP 825 can include one or more logical channels. The MAC 820 may perform mapping between the logical channels and transport channels, multiplexing of MAC SDUs from one or more logical channels onto transport blocks (TBs) to be delivered to PHY 810 using the transport channels, de-multiplexing MAC SDUs to one or more logical channels from TBs delivered from the PHY 810 using transport channels, multiplexing MAC SDUs onto TBs, scheduling information reporting, error correction through HARQ, and logical channel prioritization.

Instance(s) of RLC 830 may process requests from and provide indications to an instance of PDCP 840 using one or more radio link control service access points (RLC-SAP) 835. These requests and indications communicated using RLC-SAP 835 can include one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 can include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 can include one or more QoS flows. The SDAP 847 may map QoS flows to data radio bearers (DRBs), and vice versa, and may also mark QoS flow identifiers (QFIs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some implementations, the SDAP 847 may only be used in NR implementations and may not be used in LTE implementations.

The RRC 855 may configure, using one or more management service access points (M-SAP), aspects of one or more protocol layers, which can include one or more instances of PHY 810, MAC 820, RLC 830, PDCP 840 and SDAP 847. In some implementations, an instance of RRC 855 may process requests from and provide indications to one or more NAS entities 857 using one or more RRC-SAPs 856. The main services and functions of the RRC 855 can include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more information elements, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some implementations, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In some implementations, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some implementations, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some implementations, a control plane protocol stack can include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863. In some implementations, such as NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise elementary procedures (EPs). An NG-AP EP may be a unit of interaction between the NG-RAN node 111 and the AMF 321. The NG-AP 863 services can include two groups: UE-associated services (e.g., services related to a UE 101) and non-UE-associated services (e.g., services related to the whole NG interface instance between the NG-RAN node 111 and AMF 321). These services can include functions such as, but not limited to: a paging function for the sending of paging requests to NG-RAN nodes 111 involved in a particular paging area; a UE context management function for allowing the AMF 321 to establish, modify, or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP can include S1-AP EPs. An S1-AP EP may be a unit of interaction between the E-UTRAN node 111 and an MME 221 within a LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and can include X2AP basic mobility procedures and X2AP global procedures. The X2AP basic mobility procedures can include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 can include L2 and L1 layer communication links (e.g., wired or wireless) with the MME/AMF to exchange information.

In some implementations, a user plane protocol stack can include, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and can include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some implementations, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components and functions.

Figure 9:
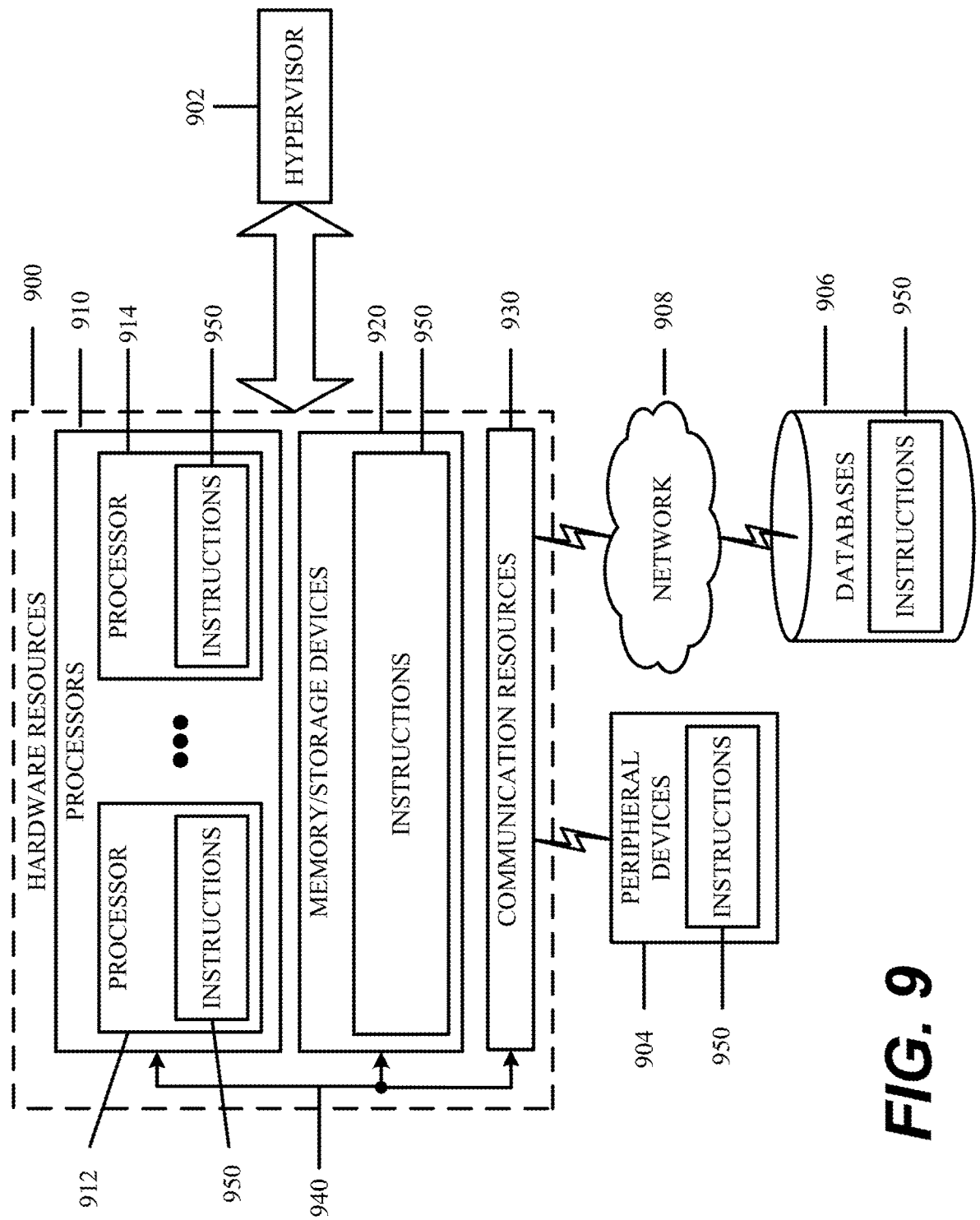
FIG. 9 illustrates an example of a computer system.

FIG. 9 illustrates a block diagram of example of a computer system that includes components for reading instructions from a machine-readable or computer-readable medium (e.g., a non-transitory machine-readable storage medium) and performing any one or more of the techniques described herein. In this example, FIG. 9 shows a diagrammatic representation of hardware resources 900 including one or more processors (or processor cores) 910, one or more memory or storage devices 920, and one or more communication resources 930, each of which may be communicatively coupled using a bus 940. For implementations where node virtualization (e.g., NFV) is utilized, a hypervisor 902 may be executed to provide an execution environment for one or more network slices or sub-slices to utilize the hardware resources 900.

The processors 910 may include a processor 912 and a processor 914. The processor(s) 910 may be, for example, a CPU, a RISC processor, a CISC processor, a graphics processing unit (GPU), a DSP such as a baseband processor, an ASIC, an FPGA, a radiofrequency integrated circuit (RFIC), another processor (including those discussed herein), or any suitable combination thereof. The memory/storage devices 920 may include main memory, disk storage, or any suitable combination thereof. The memory/storage devices 920 may include, but are not limited to, any type of volatile or nonvolatile memory such as DRAM, SRAM, EPROM, EEPROM, Flash memory, or solid-state storage, or combinations of them, among others.

The communication resources 930 can include interconnection or network interface components or other suitable devices to communicate with one or more peripheral devices 904 or one or more databases 906 using a network 908. For example, the communication resources 930 can include wired communication components (e.g., for coupling using USB), cellular communication components, NFC components, Bluetooth® (or Bluetooth® Low Energy) components, Wi-Fi components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

Mobile communication has evolved significantly from early voice systems to today's highly sophisticated integrated communication platform. The next generation wireless communication system such as NR can provide access to information and sharing of data anywhere, anytime by various users and applications. NR is expected to be a unified network/system that target to meet vastly different and performance dimensions and services. One major enhancement for LTE in Rel-13 had been to enable the operation of cellular networks in the unlicensed spectrum, via LAA. Ever since, exploiting the access of unlicensed spectrum has been considered by 3GPP as one of the promising solutions to cope with the ever increasing growth of wireless data traffic. One of the important considerations for LTE to operate in unlicensed spectrum can be to ensure fair co-existence with incumbent systems like WLANs, which has been a focus of LAA standardization efforts since Rel. 13. NR has been expanded to us unlicensed spectrum. NR-Unlicensed (NR-U) involves NR based access on unlicensed spectrum.

Following the trend of LTE enhancements, a study item on NR based access to unlicensed spectrum (NR-unlicensed) has been started in 3GPP Rel-15. Within the scope of this study item, one of the primary objectives is to identify additional functionalities that are needed for a PHY layer design of NR to operate in unlicensed spectrum. In particular, it may be desirable to minimize the design efforts by identifying the essential enhancements needed for Rel-15 NR design to enable unlicensed operation, while avoiding unnecessary divergence from Rel-15 NR licensed framework. NR-based operation in unlicensed spectrum should not impact deployed Wi-Fi services (data, video and voice services) more than an additional Wi-Fi network on the same carrier.

NR-U technologies can be categorized into different modes of network operation including Carrier Aggregation (CA), Dual Connectivity (DC), and Standalone (SA) modes. The adoption of LBT in LTE based LAA systems provided fair coexistence with the neighboring systems sharing the unlicensed spectrum in addition to fulfilling the regulatory requirements. The LBT based channel access mechanism fundamentally resembles the WLAN's CSMA/CA principles. Any node that intends to transmit in unlicensed spectrum first performs a channel sensing operation before initiating any transmission. An additional random back-off mechanism is adopted to avoid collisions when more than one nodes senses the channel as idle and transmits simultaneously.

In NR-U, one cell can have a carrier BW greater than 20 MHz like the NR wideband operation. However due to the licensed band restriction, the LBT has to be performed based on 20 MHz subband, which can be referred to as a LBT subband or LBT bandwidth (BW). Since there can be multiple LBT subbands inside one cell for wideband operation, the operation may depend on how many LBT subband are available to be used by performing separate LBT. For this purpose, a NR-U work item description defines the wideband operation as follows: wideband operation (in integer multiples of 20 MHz) for DL and UL for NR-U can be supported with multiple serving cells, and wideband operation (in integer multiples of 20 MHz) for DL and UL for NR-U can be supported with one serving cell with bandwidth greater than 20 MHz with potential scheduling constraint subject to input from RAN2 and RAN4 on feasibility of operating the wideband carrier when LBT is unsuccessful in one or more LBT subbands within the wideband carrier. In some implementations, for wideband operation cases, CCA can be performed in units of 20 MHz (at least for 5 GHz spectrum). Other units are possible. The present disclosure provides, among other things, mechanisms to operate wideband cells. One or more of the described mechanisms can increase the accuracy of wideband operations with LBT procedures.

Figure 10:
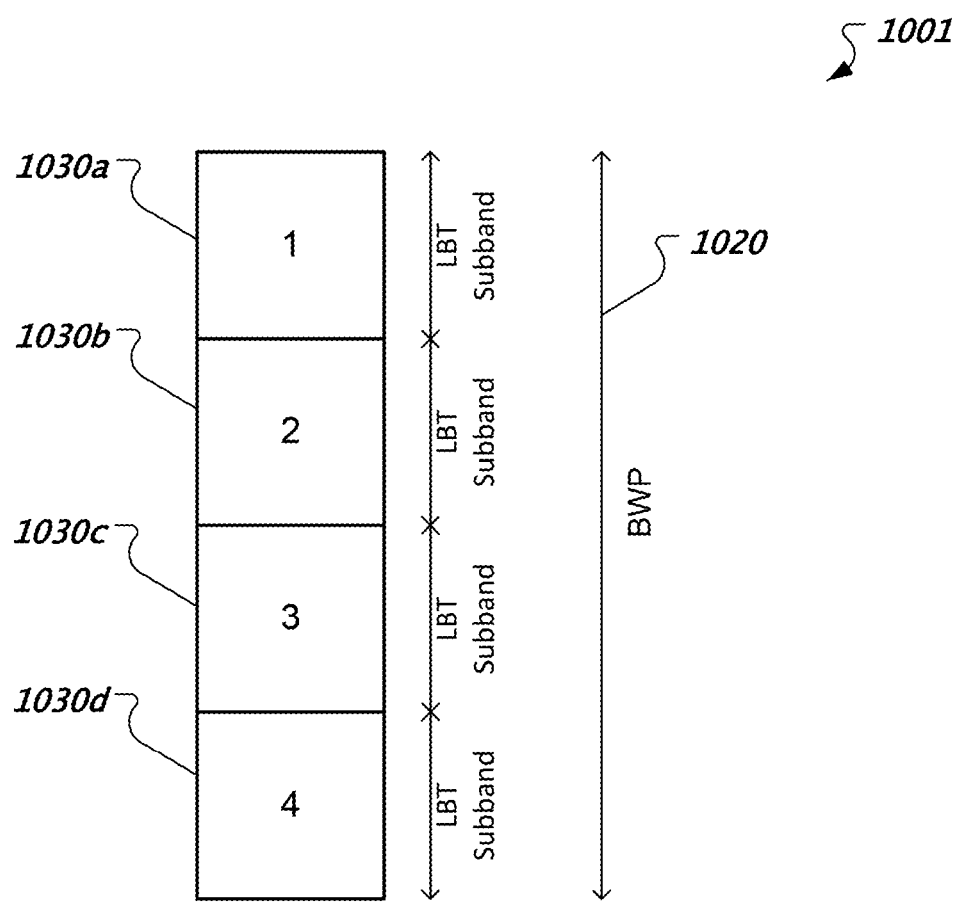
FIG. 10 illustrates an example of a wideband configuration for a UE.

FIG. 10 illustrates an example of a wideband configuration 1001 for a UE. In this example, there is one active BWP 1020 configured for a UE. A wideband configuration 1001 can include multiple LBT subbands 1030a-d arranged within the active BWP 1020. In this example, four LBT subbands 1030a-d in BWP 1020 are shown. However, more, less, or different subbands are possible. Each LBT subband 1030a-d, for example, can have a bandwidth of 20 MHz. The active BWP 1020 can have a total bandwidth greater than 20 MHz, e.g., 80 MHz based on 20 MHz bandwidth for four LBT subbands 1030a-d. The wideband configuration 1001 can be used for downlink operations, uplink operations, or both. Note that a LBT subband can be referred to as a LBT bandwidth.

Wideband operations for downlink channels such as PDSCH can depend on how many LBT subbands are available for use based on LBT outcomes. For downlink wideband operations, several options are possible including but not limited to the following options. In Option 1a, multiple BWPs are configured, multiple BWPs are activated, and transmission of PDSCH occurs on one or more BWPs. In Option 1b, multiple BWPs are configured, multiple BWPs are activated, and transmission of PDSCH occurs on a single BWP. In Option 2, multiple BWPs can be configured, a single BWP is activated, and gNB transmits PDSCH on a single BWP if CCA is successful at gNB for the whole BWP. In Option 3, multiple BWPs can be configured, a single BWP is activated, and gNB transmits PDSCH on parts or whole of a single BWP where CCA is successful at gNB.

Of these options, Option 1a and 1b require multiple active BWPs, whereas Options 2 and 3 can operate under a single active BWP. The main difference between Option 2 and Option 3 is the condition of the PDSCH transmissions. For Option 2, PDSCH can be transmitted over the whole BWP if CCA is successful for all LBT subbands. For Option 3, PDSCH can be transmitted over the part of BWP where CCA is successful. For Option 2, operation is simple since any of the LBT subbands fails CCA, then nothing is transmitted in DL. However for Option 3, available subbands for PDSCH transmission depends on the CCA of each LBT subband. And also, if some LBT subbands fail CCA inside the BWP, the adjacent LBT subband may experience some interference from the device which is using the subband. As such, downlink operations may include using a guard band for the edge of the available subbands for Option 3.

A wireless system can provide a mechanism for the UE to detect whether a gNB is transmitting across multiple carriers or multiple LBT bandwidths in a carrier. In some implementations, a gNB can explicitly indicate the gNB's transmitted LBT bandwidths to the UEs. Blind detection of available LBT bandwidths may not be sufficiently reliable and can lead to unnecessary operations if errors occur. An explicit indication can help the UE to decode the transmitted information and avoid or reduce the need for blind detection of available LBT bandwidths. In some implementations, a DCI format 2_0 message in a group common PDCCH (GC-PDCCH) can be used to indicate a channel occupancy time (COT) structure.

GC-PDCCH can be used to carry at least slot format related information. DCI format 2_0 can be used for notifying the slot format. A DCI format 2_0 with CRC scrambled by a slot format indication radio network temporary identifier (SFI-RNTI) includes N slot indicators (e.g., Slot format indicator 1, Slot format indicator 2, . . . , Slot format indicator N), where N is a number. The size of DCI format 2_0 is configurable by higher layers up to 128 bits, according to subclause 11.1.1 of 3GPP TS 38.213. In some implementations, DCI format 2_0 also carries an indication of the COT structure in the time domain.

In some implementations, a DCI format 2_0 is used to indicate available LBT bandwidth information, and can include a frequency domain COT structure and a time domain COT structure. If the available LBT bandwidth information is transmitted in DCI format 2_0 via GC-PDCCH, additional information may be applied regarding the LBT bandwidth in which the GC-PDCCH is transmitted since there may be some LBT bandwidths that are available and some remaining LBT bandwidths that are not available for the GC-PDCCH transmission. For example, it can be assumed that each LBT bandwidth includes at least one CORESET and at least one PDCCH candidate for GC-PDCCH is configured for each LBT bandwidth. The gNB transmits the GC-PDCCH in one of the PDCCH candidate locations, which can be positioned within an available LBT bandwidth.

Figure 11:
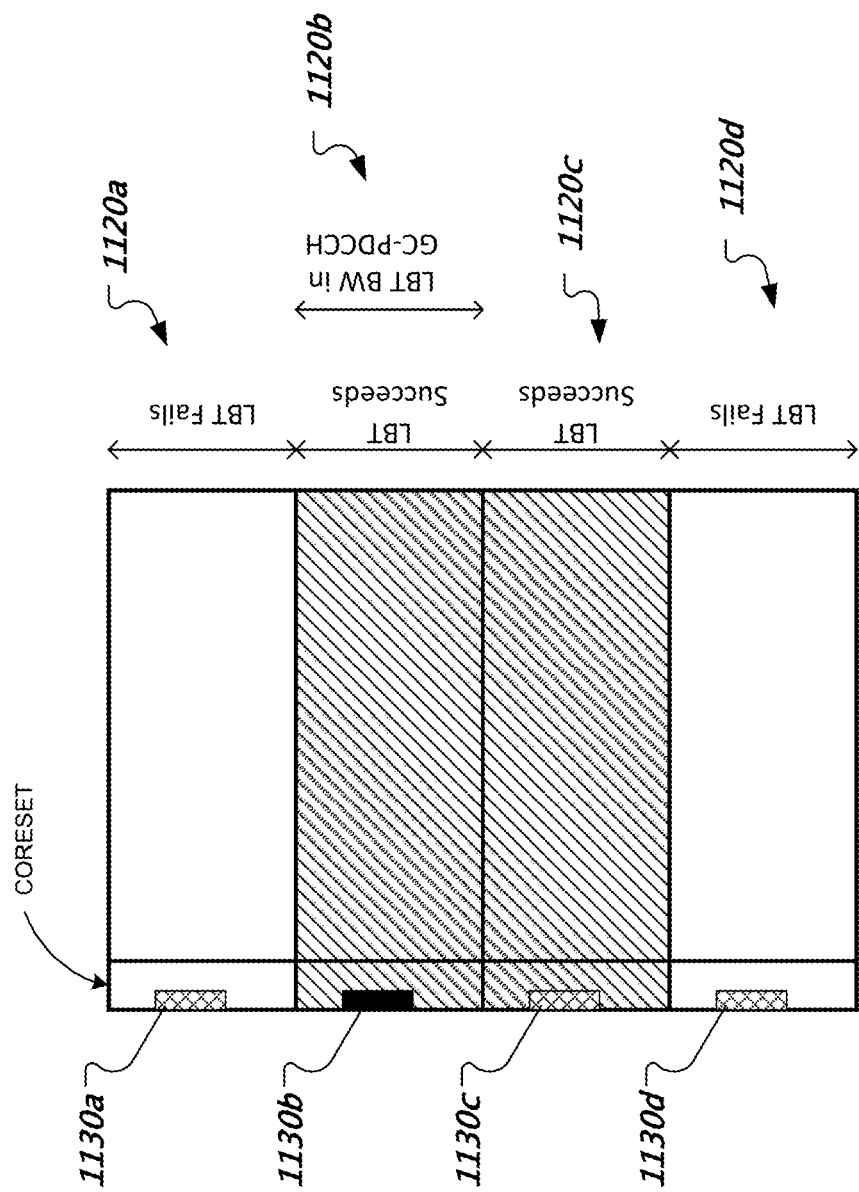
FIG. 11 illustrates an example of a GC-PDCCH transmission for indicating an available LBT bandwidth.

FIG. 11 illustrates an example of a GC-PDCCH transmission for indicating an available LBT bandwidth. In this example, a BWP includes four LBT bandwidths 1120a-d. Each LBT bandwidth 1120a-d includes at least one CORESET. Further, at least one PDCCH candidate for GC-PDCCH can be configured for each LBT bandwidth 1120a-d. Accordingly, there are four PDCCH candidate locations 1130a-d in this example. The gNB transmits the GC-PDCCH in one of the PDCCH candidate locations 1130b, which is positioned within an available LBT bandwidth 1120b. The gNB can select a location from one or more of the PDCCH candidate locations 1130a-d based one or more factors such as LBT outcomes for a LBT bandwidth, e.g., whether a LBT procedure fails or succeeds for a given LBT bandwidth. The available LBT bandwidth 1120b can be indicated in the GC-PDCCH transmission using the selected PDCCH candidate location 1130b. In some implementations, the GC-PDCCH transmission includes a group common DCI message transmitted on a PDCCH. The DCI message can be based on a DCI format such as DCI format 2_0. After transmitting the GC-PDCCH indicating an available LBT bandwidth, the gNB can transmit a corresponding PDSCH transmission on the available LBT bandwidth.

In some implementations, for a CA scenario between a licensed band and an unlicensed band (e.g., LAA scenario), a gNB can transmit the GC-PDCCH indicating an available LBT bandwidth using a licensed band. After transmitting the GC-PDCCH indicating an available LBT bandwidth using a licensed band, the gNB can transmit a corresponding PDSCH transmission on the available unlicensed band.

In some cases, after performing one or more LBT procedures to acquire a COT, a GC-PDCCH message may not be ready for transmission at the beginning of the gNB acquired COT. If the message is not ready at the beginning, the gNB can transmit the GC-PDCCH message in one or more subsequent GC-PDCCH monitoring occasions. As such, the gNB can configure multiple monitoring opportunities for GC-PDCCH inside the COT.

Figure 12:
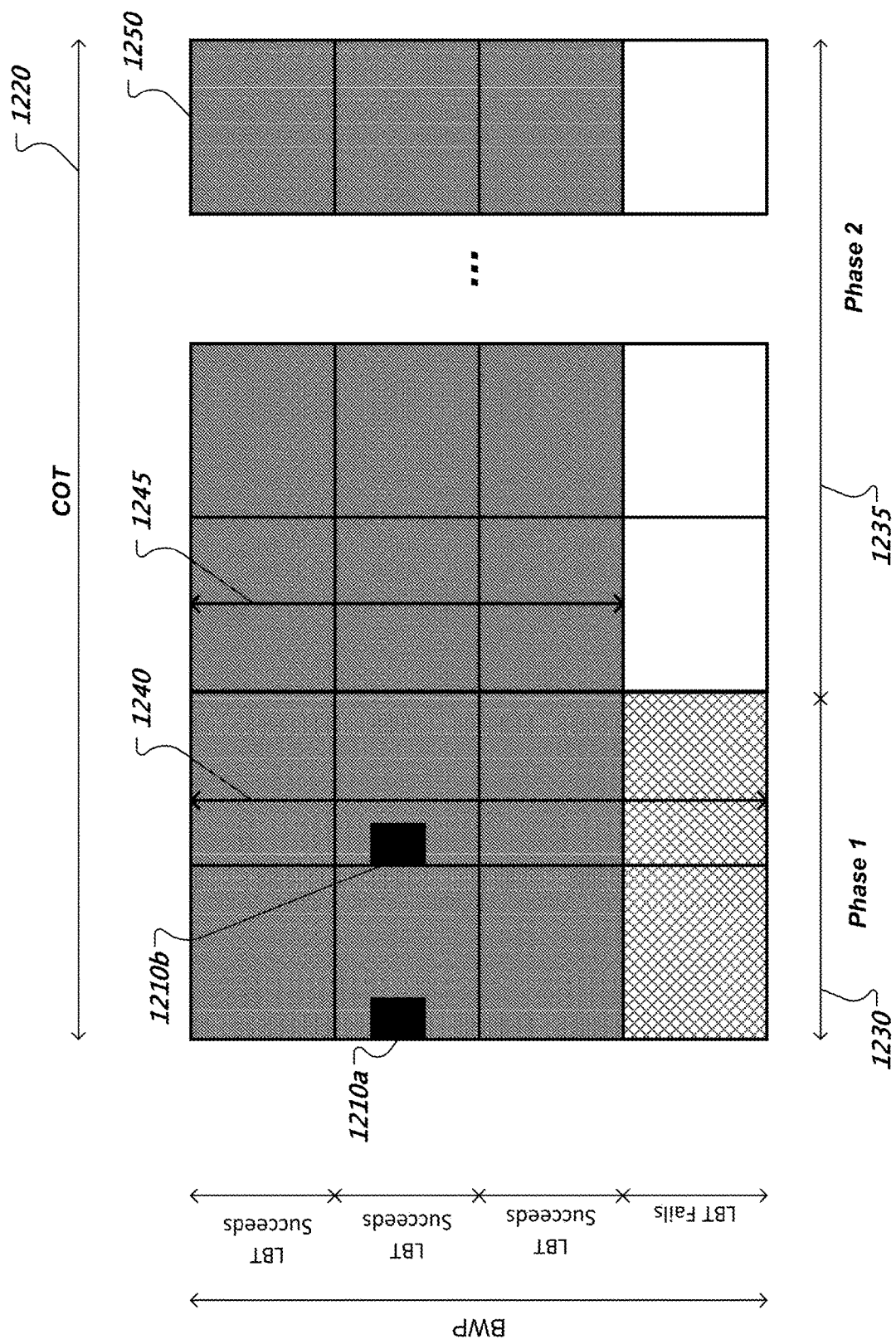
FIG. 12 illustrates an example of using different PDSCH encoding techniques during a COT duration where a PDSCH adjustment is made based on LBT outcomes.

FIG. 12 illustrates an example of using different PDSCH encoding techniques during a COT duration where a PDSCH adjustment is made based on LBT outcomes. In this example, the gNB acquired COT 1220 can be divided into a phase 1 portion 1230 and a phase 2 portion 1235. The gNB can transmit two or more DCI messages in GC-PDCCH 1210a-b at different times during the phase 1 portion 1230.

In the initial slot or slots of the phase 1 portion 1230, a first PDSCH can be mapped 1240 using the entire BWP where the gNB punctures the LBT bandwidth having an unsuccessful LBT outcome, e.g., an unsuccessful CCA outcome. After sufficient time for the gNB, the gNB can adjust the PDSCH according to the available LBT bandwidths in the remaining time of the same COT, e.g., the phase 2 portion 1235. For example, in the initial slot or slots of the phase 2 portion 1235, a second PDSCH can be mapped 1245 using a rate-matching technique based on the available LBT bandwidths.

The UE can be configured to receive the whole BWP during the phase 1 portion 1230. However, the UE may try to blindly detect which LBT bandwidths are available using DMRS or try to decode GC-PDCCH as fast as possible and perform the decoding using the knowledge of the punctured parts. In some implementations, during the phase 2 portion 1235, the UE knows which LBT bandwidths are available and performs rate-matching around the LBT bandwidth that is not available due to LBT failure.

In some implementations, for the transmission of PUSCH 1250, the UE can use the whole scheduled BW for the encoding of PUSCH, but punctures the data which is mapped to the LBT bandwidth where CCA was not successful. In some implementations, for UL, there can be one transmission phase and puncturing can be applied for the LBT bandwidth where CCA is not successful during the whole COT duration.

One or more primary channels can be defined in some implementations in accordance with regulatory requirements. The gNB can select the primary channel. In some implementations, the gNB can select the primary channel from a raster of available channels. A GC-PDCCH with an indication of the LBT bandwidth can be carried within the primary channel. The DL transmission over the active BWP can be conditional to the success of the LBT over the primary channel. Note that some regulatory requirements may specify that the primary channel cannot be changed more than once per second, however they do not limit the amount of time the same channel can be used as a primary channel.

A UE can expect a DL transmission over a primary channel. If the primary channel is not known a priori, the UE perform blind detection to determine the primary channel for the initial acquisition of the primary channel and then use the detected primary channel for subsequent communications. In some implementations, the UE behavior can include, in phase 1, locating a primary channel by detecting DMRS, decoding the GC-PDCCH, or both if the primary channel is not known a prior and can extract the information related to the LBT bandwidth; and in phase 2, once the LBT bandwidth is known, performing RF retuning and decode the information over the intended activated BWP. If the primary channel is known a priori or has been already detected in a prior DL burst, the UE can decode the GC-PDCCH without blind detection and can extract the information related to the LBT bandwidth.

Figure 13:
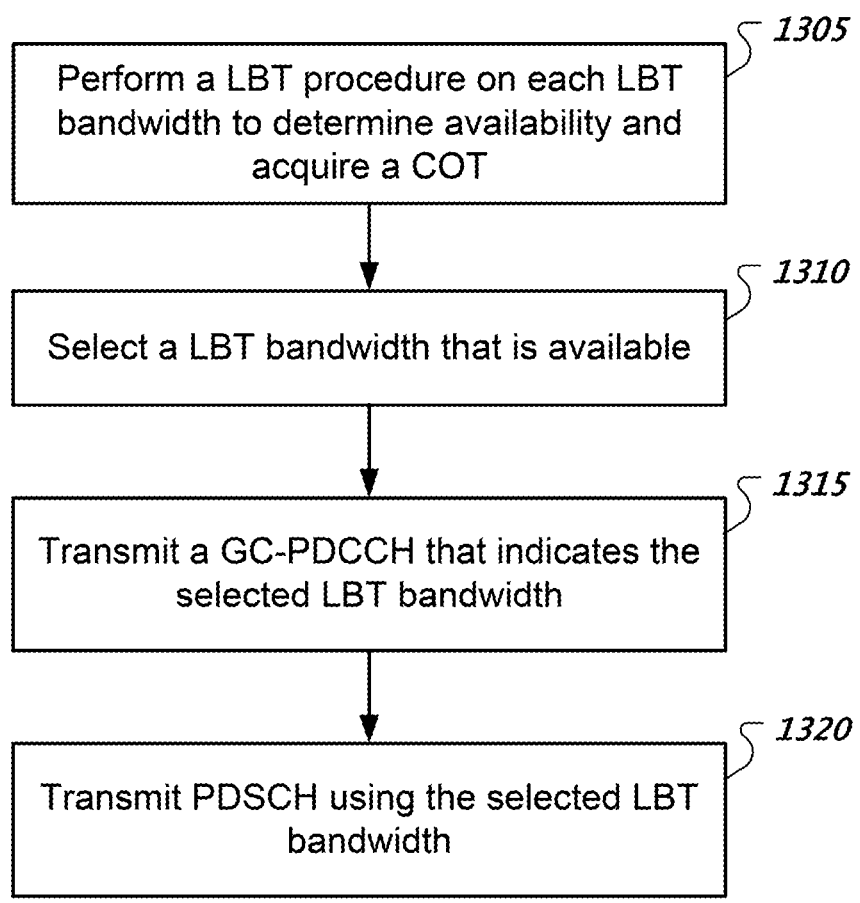
FIG. 13 illustrates a flowchart of an example of a process for LBT-based operations in unlicensed spectrum performed by a base station.

FIG. 13 illustrates a flowchart of an example of a process for LBT-based operations in unlicensed spectrum performed by a base station. The process can be performed by a base station such as a RAN node 111 in FIG. 1. At 1305, the base station performs a LBT procedure on each LBT bandwidth to determine availability and acquire a COT. Performing a LBT procedure can include causing circuitry to perform a CCA on a particular LBT subband. In some implementations, LBT procedures for multiple subbands can be performed concurrently. A passing outcome of the LBT procedure can indicated that the channel is clear. A failing outcome of the LBT procedure can indicate that the channel is not clear, e.g., another device's transmission was detected during a CCA.

At 1310, the base station can select a LBT bandwidth that is available. Selecting a LBT bandwidth that is available can include selecting a LBT bandwidth that has successfully passed a LBT procedure. At 1315, the base station can transmit a GC-PDCCH that indicates the selected LBT bandwidth. In some implementations, the GC-PDCCH transmission includes a group common DCI message transmitted on a PDCCH. The DCI message can be based on a DCI format such as DCI format 2_0. In some implementations, the transmitted GC-PDCCH includes a DCI message that contains including available bandwidth information and a COT duration. In some implementations, the available bandwidth information can include one or more available resource block sets that corresponding to one or more selected LBT bandwidths.

At 1320, the base station can transmit PDSCH using the selected LBT bandwidth. In some implementations, performing a PDSCH transmission can include puncturing a part of the PDSCH transmission that that overlaps with the LBT bandwidths that are not available, e.g., LBT bandwidths associated with failed a LBT procedure. In some implementations, performing a PDSCH transmission can include performing a rate matching operation using the LBT bandwidths that are available.

A LBT-based wireless communication technique performed by a base station such as a gNB can include transmitting one or more downlink channels using unlicensed spectrum, where the transmission of PDSCH depends on the LBT outcomes of each LBT bandwidth. In some implementations, the PDSCH is transmitted using the LBT bandwidth where CCA is successful. In some implementations, a GC-PDCCH is transmitted via a LBT bandwidth associated with a successful CCA outcome. Candidate positions for a GC-PDCCH transmission can be positioned in each LBT bandwidth inside a bandwidth part. In some implementations, a licensed carrier is used for the transmission of GC-PDCCH. In some implementations, GC-PDCCH is transmitted in the beginning of a COT. In some implementations, GC-PDCCH is transmitted in the middle of a COT. In some implementations, a GC-PDCCH is transmitted multiple times inside a COT. In some implementations, for the initial part of a COT, a PDSCH is encoded using the whole bandwidth part and transmitted over the available LBT bandwidth, where the base station punctures data around the unavailable LBT bandwidth. In some implementations, except for the initial part of the COT, PDSCH is encoded by rate matching data around the unavailable LBT bandwidth.

Figure 14:
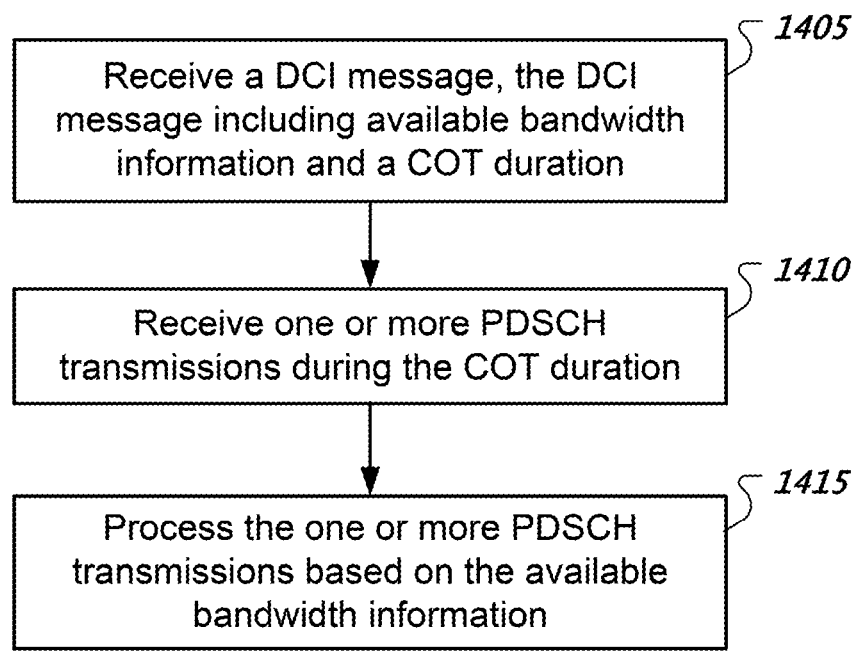
FIG. 14 illustrates a flowchart of an example of a process for LBT-based operations in unlicensed spectrum performed by a UE.

FIG. 14 illustrates a flowchart of an example of a process for LBT-based operations in unlicensed spectrum performed by a UE. The process can be performed by a UE such as a UE 101 in FIG. 1. At 1405, the UE receives a DCI message. The DCI message can include available bandwidth information and a COT duration. The available bandwidth information can be associated with one or more LBT bandwidths of a BWP in unlicensed spectrum. In some implementations, the available bandwidth information can include one or more available resource block sets that corresponding to one or more selected LBT bandwidths. Receiving the DCI message can include receiving the DCI message over a GC-PDCCH in a primary channel. In some implementations, the UE can be configured to decode at decoding at one or more PDCCH candidate locations within the BWP to locate the GC-PDCCH. In some implementations, the GC-PDCCH is transmitted in licensed spectrum.

At 1410, the UE receives one or more PDSCH transmissions during the COT duration. In some implementations, the one or more PDSCH transmissions include a first PDSCH transmission and a second PDSCH transmission. The first PDSCH transmission can be encoded using the BWP in its entirety including one or more available LBT bandwidths of the BWP and one or more unavailable LBT bandwidths of the BWP, where puncturing is applied to the one or more unavailable LBT bandwidths. The second PDSCH transmission can be encoded using the one or more available LBT bandwidths. At 1415, the UE processes the one or more PDSCH transmissions based on the available bandwidth information. Processing the one or more PDSCH transmissions can include decoding one or more signals received in one or more LBT bandwidths of the BWP.

In some implementations, the UE can encode data for a PUSCH transmission using the BWP in its entirety including one or more available LBT bandwidths of the BWP and one or more unavailable LBT bandwidths of the BWP, where puncturing is applied to the one or more unavailable LBT bandwidths. In some implementations, the UE can encode data for a PUSCH transmission using the one or more available LBT bandwidths of the BWP.

A LBT-based technique performed by a UE can include attempting to decode a received DCI message; and identify, based on the decoded DCI, LBT bandwidth information and a time domain channel occupancy time (COT) structure. In some implementations, the LBT bandwidth information includes a frequency domain COT structure. In some implementations, the DCI message is DCI format 2_0. The technique can include receiving the DCI message over a GC-PDCCH. The technique can include attempting to decode at least one PDCCH candidate for the GC-PDCCH positioned within an available LBT bandwidth.

The technique can include receiving the GC-PDCCH in a licensed band or an unlicensed band. The technique can include receiving the GC-PDCCH in a next monitoring occasion of the GC-PDCCH if the GC-PDCCH is not ready in a beginning of a gNB acquired COT. In some implementations, a PDSCH is mapped assuming that a whole BWP is available, where the PDSCH is encoded using the whole BWP, and the LBT bandwidth is punctured where CCA is not successful. In some implementations, the gNB can adjust the PDSCH according to available LBT bandwidths in a remaining time of a same COT. The technique can include performing, by the UE, blind detection of available LBT bandwidths using a DMRS. The technique can include attempting to decode the GC-PDCCH using knowledge of one or more punctured parts. The technique can include performing rate-matching around LBT bandwidths that are not available due to LBT failure.

The technique can include encoding data for a PUSCH transmission using a whole scheduled BW; and transmitting the PUSCH. The technique can include puncturing data that is mapped to the LBT bandwidth where CCA is not successful during at least part of a COT duration. In some implementations, puncturing is applied for the LBT bandwidth where CCA is not successful during a whole COT duration. In some implementations, the GC-PDCCH with the indication of the LBT bandwidth is carried in a primary channel. In some implementations, GC-PDCCH is transmitted after a beginning portion of a COT.

In some implementations, the UE can, during a first phase, attempt to find a primary channel by detecting a DMRS, decoding a GC-PDCCH, or both unless the primary channel is known a priori or has been already detected in a prior downlink burst. The UE can attempt to decode the GC-PDCCH without using blind detection and can extract the information related to the LBT bandwidth from a decoded GC-PDCCH. During a second phase, the UE can perform RF retuning and can attempt to decode information over an intended activated BWP.

These and other techniques can be performed by an apparatus that is implemented in or employed by one or more types of network components, user devices, or both. In some implementations, one or more non-transitory computer-readable media comprising instructions to cause an electronic device, upon execution of the instructions by one or more processors of the electronic device, to perform one or more of the described techniques. An apparatus can include one or more processors and one or more computer-readable media comprising instructions that, when executed by the one or more processors, cause the one or more processors to perform one or more of the described techniques.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The methods described herein can be implemented in circuitry such as one or more of: integrated circuit, logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), or some combination thereof. Examples of processors can include Apple A-series processors, Intel® Architecture Core™ processors, ARM processors, AMD processors, and Qualcomm processors. Other types of processors are possible. In some implementations, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. Circuitry can also include radio circuitry such as a transmitter, receiver, or a transceiver.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    receiving a downlink control information (DCI) message, wherein the DCI message comprises available bandwidth information and a channel occupancy time (COT) duration, wherein the available bandwidth information is associated with one or more listen-before-talk (LBT) bandwidths of a bandwidth part (BWP) in unlicensed spectrum;
    receiving, in the BWP, one or more physical downlink shared channel (PDSCH) transmissions during the COT duration;
    processing the one or more PDSCH transmissions based on the available bandwidth information; and
    encoding data for a physical uplink shared channel (PUSCH) transmission using the BWP in its entirety including one or more available LBT bandwidths of the BWP and one or more unavailable LBT bandwidths of the BWP, wherein puncturing is applied to the one or more unavailable LBT bandwidths.

2. The method of claim 1, wherein receiving the DCI message comprises receiving the DCI message over a group common physical downlink control channel (GC-PDCCH);
    the method further comprising decoding at one or more PDCCH candidate locations within the BWP to locate the GC-PDCCH.

3. The method of claim 2, wherein the decoding comprises decoding at the one or more PDCCH candidate locations during two or more monitoring occasions within the COT duration.

4. The method of claim 2, wherein:
    the DCI message comprises an indication of an available LBT bandwidth;
    the DCI message is carried in a primary channel; and
    receiving the one or more PDSCH transmissions during the COT uses the primary channel and the indication of the available LBT bandwidth.

5. The method of claim 2, comprising:
    determining a primary channel based on detecting a demodulation reference signal (DMRS) or decoding the GC-PDCCH, wherein:
    receiving the one or more PDSCH transmissions during the COT uses the primary channel.

6. The method of claim 1, wherein receiving the DCI message comprises receiving the DCI message over a group common physical downlink control channel (GC-PDCCH) in licensed spectrum.

7. The method of claim 1, wherein the one or more PDSCH transmissions comprise a first PDSCH transmission and a second PDSCH transmission, wherein the first PDSCH transmission is encoded using the BWP in its entirety including one or more available LBT bandwidths of the BWP and one or more unavailable LBT bandwidths of the BWP, and wherein the second PDSCH transmission is encoded using the one or more available LBT bandwidths.

8. A baseband processor comprising memory storing instructions that, when executed by the baseband processor, cause the baseband processor to perform operations comprising:

receiving a downlink control information (DCI) message, wherein the DCI message comprises available bandwidth information and a channel occupancy time (COT) duration, wherein the available bandwidth information is associated with one or more listen-before-talk (LBT) bandwidths of a bandwidth part (BWP) in unlicensed spectrum;

receiving one or more physical downlink shared channel (PDSCH) transmissions in the BWP during the COT duration; and processing the one or more PDSCH transmissions based on the available bandwidth information; and encoding data for a physical uplink shared channel (PUSCH) transmission using the BWP in its entirety including one or more available LBT bandwidths of the BWP and one or more unavailable LBT bandwidths of the BWP, wherein puncturing is applied to the one or more unavailable LBT bandwidths.

9. The baseband processor of claim 8, wherein receiving the DCI message comprises receiving the DCI message over a group common physical downlink control channel (GC-PDCCH);

the operations comprising decoding at one or more PDCCH candidate locations within the BWP to locate the GC-PDCCH.

10. The baseband processor of claim 9, wherein the decoding comprises decoding at the one or more PDCCH candidate locations during two or more monitoring occasions within the COT duration.

11. The baseband processor of claim 9, wherein the DCI message comprises an indication of an available LBT bandwidth, wherein the DCI message is carried in a primary channel.

12. The baseband processor of claim 9, wherein the operations comprise:

determining a primary channel based on detecting a demodulation reference signal (DMRS) or decoding the GC-PDCCH.

13. The baseband processor of claim 8, wherein receiving the DCI message comprises receiving the DCI message over a group common physical downlink control channel (GC-PDCCH) in licensed spectrum.

14. The baseband processor of claim 8, wherein the one or more PDSCH transmissions comprise a first PDSCH transmission and a second PDSCH transmission, wherein the first PDSCH transmission is encoded using the BWP in its entirety including one or more available LBT bandwidths of the BWP and one or more unavailable LBT bandwidths of the BWP, and wherein the second PDSCH transmission is encoded using the one or more available LBT bandwidths.

15. An apparatus one or more processors and a memory storing instructions that, when executed by the one or more processors, cause the one or more processors to perform operations comprising:

performing a listen-before-talk (LBT) procedure on a plurality of LBT bandwidths of a bandwidth part (BWP) in an unlicensed spectrum to produce LBT outcomes;

selecting one or more LBT bandwidths of the plurality of LBT bandwidths based on the LBT outcomes;

transmitting a DCI message that indicates the selected one or more LBT bandwidths, wherein the DCI message comprises available bandwidth information and a channel occupancy time (COT) duration;

performing one or more physical downlink shared channel (PDSCH) transmissions in the one or more selected LBT bandwidths during the COT duration; and decoding data for a physical uplink shared channel (PUSCH) transmission that was encoded using the BWP in its entirety including one or more available LBT bandwidths of the BWP and one or more unavailable LBT bandwidths of the BWP, wherein puncturing was applied to the one or more unavailable LBT bandwidths.

16. The apparatus of claim 15, wherein transmitting the DCI message comprises transmitting the DCI message over a group common physical downlink control channel (GC-PDCCH) in a primary channel;

wherein the operations comprise transmitting the DCI message over the GC-PDCCH two or more times during the COT duration.

17. The apparatus of claim 15, wherein transmitting the DCI message comprises transmitting the DCI message over a group common physical downlink control channel (GC-PDCCH) in licensed spectrum.

18. The apparatus of claim 15, wherein the one or more PDSCH transmissions comprise a first PDSCH transmission and a second PDSCH transmission, wherein the first PDSCH transmission is encoded using the BWP in its entirety including one or more available LBT bandwidths of the BWP and one or more unavailable LBT bandwidths of the BWP such that puncturing is applied to the one or more unavailable LBT bandwidths, and wherein the second PDSCH transmission is encoded using the one or more available LBT bandwidths.

* * * * *